US008448206B2

(12) United States Patent
Roberts et al.

(10) Patent No.: US 8,448,206 B2
(45) Date of Patent: May 21, 2013

(54) AUGMENTING INTERACTIVE TELEVISION CONTENT UTILIZING A DYNAMIC CLOUD ACTIVITY GUIDE

(75) Inventors: Brian F Roberts, Dallas, TX (US); Greg Johns, Irving, TX (US); Shafiq Kassam, Lewisville, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 386 days.

(21) Appl. No.: 12/781,560

(22) Filed: May 17, 2010

(65) Prior Publication Data

US 2011/0283304 A1 Nov. 17, 2011

(51) Int. Cl.
*G06F 13/00* (2006.01)
(52) U.S. Cl.
USPC .................................. 725/40; 725/46; 725/48
(58) Field of Classification Search
USPC .................................................. 725/40, 46, 48
See application file for complete search history.

(56) References Cited

U.S. PATENT DOCUMENTS

| 7,293,275 | B1 * | 11/2007 | Krieger et al. | 725/40 |
| 8,166,029 | B2 * | 4/2012 | Park et al. | 707/732 |
| 2002/0053084 | A1 * | 5/2002 | Escobar et al. | 725/47 |

OTHER PUBLICATIONS

Mendoza, "Can Social Media Chatter Predict Oscar Winners?", Mar. 5, 2010, 5 pages.
Sysomos Inc., "Business Intelligence for Social Media", Mar. 25, 2010 (print date), 1 page.
Sysomos Inc., "Solutions for you—Why is Social Media Important for You?", Mar. 25, 2010 (print date), 3 pages.
IMDb.com, Inc., "What are STARmeter & MOVIEmeter?", Mar. 24, 2010 (print date), 1 page.
A. Tee. Dub., "Measuring Popularity", Jun. 22, 2008, 3 pages.
Sysomos Inc., "Solutions for you—API/Data Partners", Mar. 25, 2010 (print date), 1 page.
IMDb.com, Inc., "Votes by Decade: 1910-1919—Top Rated "1910s" Titles", Mar. 24, 2010 (print date), 2 pages.
The Nielsen Company, Nielsen BuzzMetrics—Millions of Consumers are Talking—Are you Listening?, Mar. 24, 2010 (print date), 2 pages.
The Nielsen Company, "Nielsen NetRatings—Online Measurement Services to Understand, Measure and Respond to Online Consumers", Mar. 24, 2010 (print date), 2 pages.
IMDb.com, Inc., "IMDB Charts: Top Movies", Mar. 19, 2010, 2 pages.

* cited by examiner

*Primary Examiner* — Brian Pendleton
*Assistant Examiner* — Olugbenga Idowu

(57) ABSTRACT

A server device configured to store settings information, the settings information indicating which type of operations are permitted by a user of a video client; receive a request to perform an operation associated with television content; perform a first operation to obtain program information associated with the television content when the settings information permits the first operation, the program information being a measure of popularity regarding the television content; perform the second operation to obtain performer information associated with the television content when the settings information permits the second operation, the performer information being a measure of popularity regarding the performer; perform the third operation to obtain review information associated with the television content when the settings information permits the third operation, the review information including reviews associated with the television content; and present, to the video client, the program information, the performer information, or the review information for display.

20 Claims, 10 Drawing Sheets

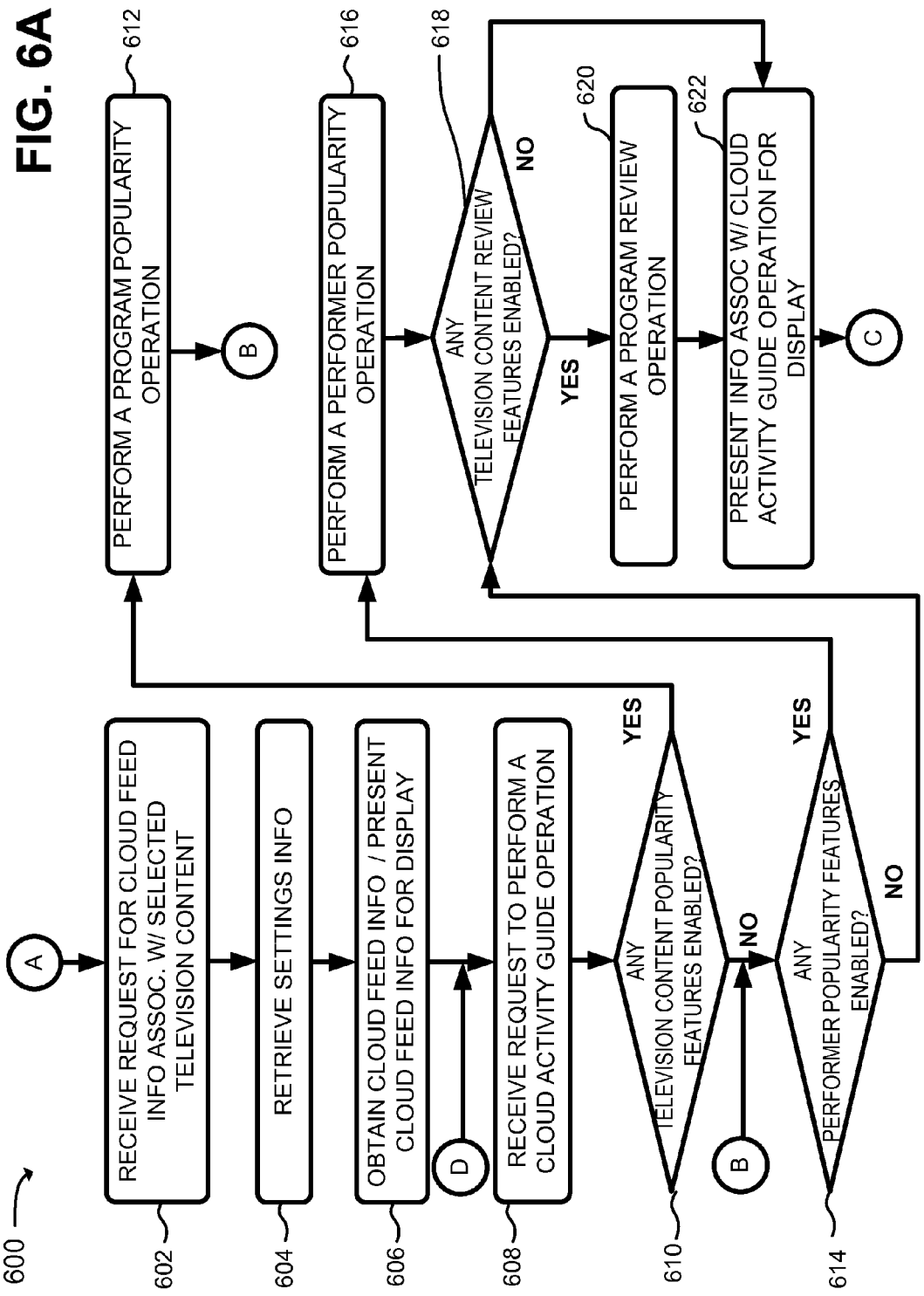

AUGMENTING INTERACTIVE TELEVISION CONTENT UTILIZING A DYNAMIC CLOUD ACTIVITY GUIDE

BACKGROUND

Television content is ever-changing. It seems that new channels, television programs, and/or features, intended to enhance the television viewing experience, get introduced every day that are providing the user with more viewing choices than ever. As a result, it is becoming increasingly difficult for users to determine what to watch amid all of the television content viewing choices.

Television content providers offer tools, such as program guides and searching functionality, that assist users in determining which television content to watch. These tools may permit the user to review a description of television content and can be useful if a user knows the name of the television content and/or the date and time at which that television content is broadcast.

BRIEF DESCRIPTION OF THE DRAWINGS

FIGS. 6A and 6B are flowcharts of an exemplary process for interacting with and using the cloud activity guide within the network of FIG. 2.

DETAILED DESCRIPTION OF PREFERRED EMBODIMENTS

Figure 1:
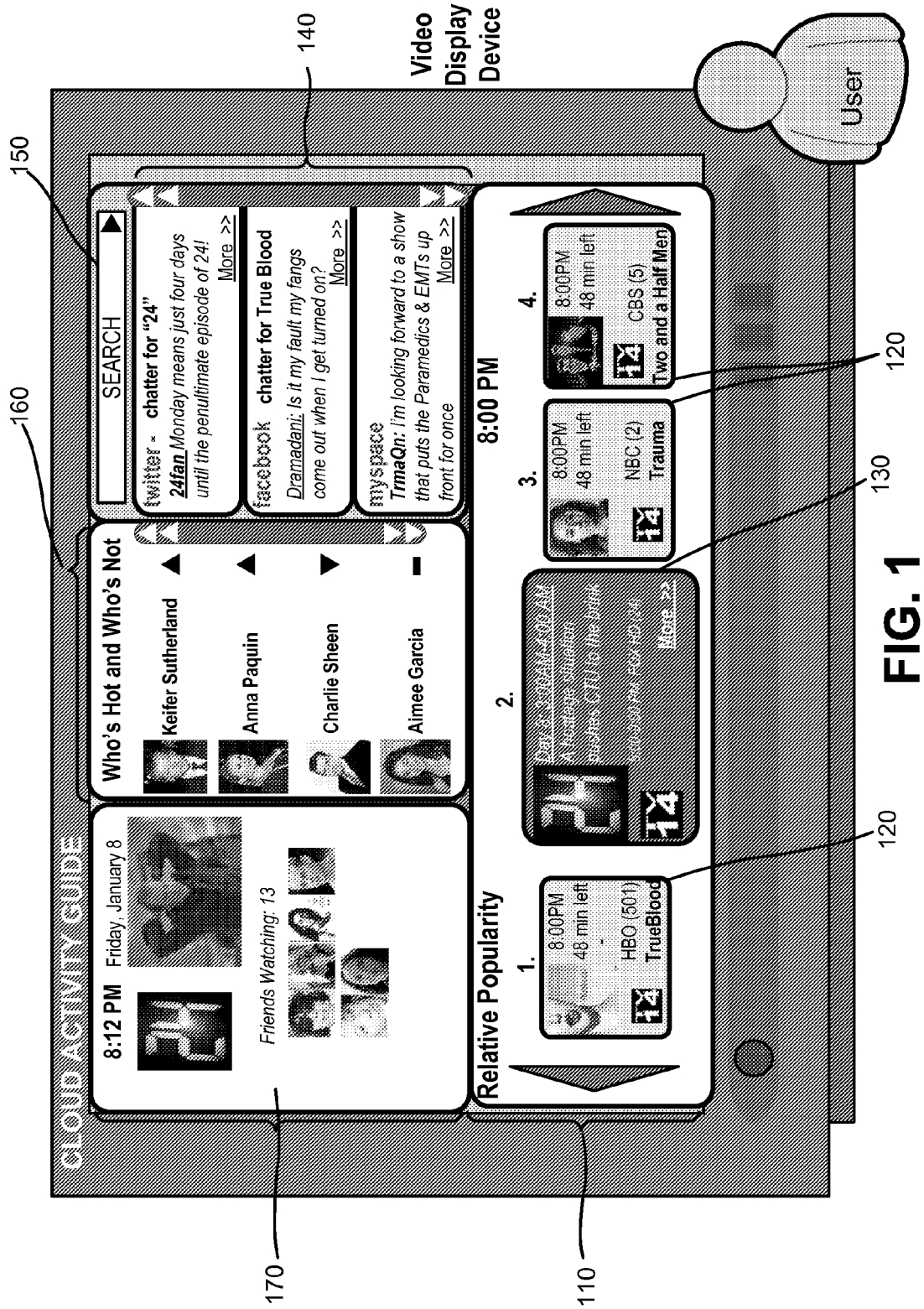
FIG. 1 is a diagram that illustrates an overview of cloud activity guide implementation described herein.

The following detailed description refers to the accompanying drawings. The same reference numbers in different drawings may identify the same or similar elements. Also, the following detailed description does not limit the invention.

An implementation described herein may include systems and/or methods that provide a cloud activity guide application that permits a user, of a video client device, to view information, dynamically obtained from a global network, such as the Internet (e.g., sometimes referred to as the "cloud"), that may assist the user in determining which television content to watch. More particularly, the cloud activity guide application (hereinafter referred to as the "guide application") may perform a cloud activity guide operation to obtain, to generate, and/or to analyze information associated with television content and/or a performer (e.g., an actor, a director, etc.) and may present the information to the user, which may aid the user in making a viewing decision regarding which television content to watch. The cloud activity guide operation may include operations to determine the popularity of television content; to determine the popularity of a performer; to obtain review information associated with the television content; to determine the amount of discussion and/or conversation associated with the television content and/or a performer that is occurring on the global network (hereinafter referred to as "Internet chatter," "chatter," and/or "Internet activity"); to perform a search for information associated with the television content or a performer; and/or to perform other operations.

As described herein, a user, of a video client device, may specify settings associated with a guide application. For example, a user may specify information source settings from which the guide application may obtain information (hereinafter referred to as "cloud feeds") to perform cloud activity guide operations. Cloud feeds may include social networking websites, news sources, Internet-based open-text forums (e.g., sometimes referred to as the "blogosphere"), such as message boards, chat rooms, discussion groups, blogs, etc., free television networks (e.g., ABC, FOX, etc.), for-pay television networks (e.g., HBO, ESPN, etc.), and/or Internet-based content providers that transmit streaming television content (e.g., as streaming video, streaming audio, streaming text, etc.).

In another example, the user may set up the guide application so that the desired information, associated with television content and/or a particular performer, is received and presented for display. In this example, the user may specify whether information, associated with the popularity of television content, is to be presented. Additionally, or alternatively, the user may specify whether popularity information corresponding to a performer (e.g., an actor, a singer, a musician, a director, a producer, etc.), associated with the television content, is to be presented. Additionally, or alternatively, the user may specify whether information, associated with the subjective quality and/or critical acclaim of television content (e.g., critic's choice, reviews, ratings, viewer sentiment, etc.), is to be presented. In yet another example the user may specify preferred television content genres (e.g., action, comedy, horror, reality, etc.), parental controls (e.g., G, PG-13, TV 14, R, MA, etc.), and/or other preferences.

As further described herein, a guide application may perform a cloud activity guide operation. For example, the guide application may generate queries and/or perform searches to determine the relative popularity of television content. In another example, the guide application may receive information from content providers and/or communicate with Internet-based web servers to determine the popularity and/or user sentiment associated with particular television content. In yet another example, the guide application may sample communications from various cloud feeds, received from content providers and/or web servers, such as message boards, blogs, news wires, social networks, etc., to determine the quantity of chatter, associated with television content, that is occurring on the global network at a particular point in time and/or over a particular period of time.

As yet further described herein, the guide application may execute performer popularity operations and/or ratings operations. For example, the guide application may generate search queries and/or may perform searches to determine the popularity of a particular performer, such as an actor, an actress, a musician, a director, a producer, etc. In another example, the guide application may communicate with websites to perform operations to determine the popularity and/or user sentiment associated with a performer. In yet another example, the guide application may sample communications from various cloud feeds, such as message boards, blogs, news wires, social networks, etc., to determine the relative user sentiment and/or activity level that is present on the Internet at a particular point in time and/or over a particular period of time.

As still further described herein, the guide application may perform program review operation. For example, the guide application may communicate with web servers to obtain critical reviews of television content and/or ratings information associated with the television content (e.g., three out of five stars, two thumbs up, etc.).

The cloud activity guide may permit a user to set up a guide application so that information received by the user may be customized to the desires of the user. The guide application may be set up to perform cloud activity guide operations that may include program popularity operations, performer popularity operations and/or program review operations. The cloud activity guide operations may generate program popularity information (e.g., from the program popularity operation), performer popularity information (e.g., from the performer popularity operation), program review information (e.g., from the program review operation), and/or other cloud activity guide information. The guide application may permit the user to dynamically receive cloud activity guide information that the user may use to determine which television content to view and/or to improve the user viewing experience.

The term "television content," as used herein, is to be broadly interpreted to include any information that may be presented for display by a video client device and perceived by a user of a video client device (e.g., by viewing and/or hearing). Examples of television content may include television shows, news broadcasts, advertisements, video on demand assets, pay per view movies, etc. Additionally, or alternatively the term "interactive television content," as used herein, is to be broadly interpreted to include any television content with which the user may interact. Examples of interactive television content may include an on-screen program guide (e.g., as further described below), a cloud activity guide (e.g., as further described below), a performer cloud activity guide (e.g., as further described below), on-screen television listings (e.g., a list of scheduled television programs, the channels where the television programs may be displayed, and/or the corresponding broadcast time for each television program, etc.), digital video recording (DVR) programming schedules, on demand service listings (e.g., video, games, music, etc.), favorites listings, music listings, game listings, bookmarked items listings, program description pages and/or television channels.

FIG. 1 is a diagram that illustrates an overview of a cloud activity guide implementation described herein. For example, a guide application, hosted by a content delivery system (not shown in FIG. 1), may send information, obtained as a result of a cloud activity guide operation, to a video client device (not shown in FIG. 1). The video client device may receive the information associated with the cloud activity guide operation and, as illustrated in FIG. 1, may present the cloud activity guide for display on a video display device. The cloud activity guide may include partitions containing a portion of the information obtained as a result of the cloud activity guide operation (e.g., hereinafter referred to as "cloudlets") performed by the guide application. For example the cloud activity guide user interface may include a program popularity cloudlet 110; a television content cloudlet 120; a highlighted cloudlet 130; a cloud feed cloudlet 140; a search cloudlet 150; a performer popularity cloudlet 160; and/or a friends cloudlet 170.

Program popularity cloudlet 110 may include information associated with the popularity of television content. For example, information associated with the popularity of television content may be obtained as a result of a program popularity operation in which the guide application communicates with content providers and/or websites, such as websites corresponding to cloud feeds specified by the user and/or set by the guide application. In one example, the popularity information may be obtained from websites that provide information associated with sales volume, the quantity of users viewing particular television content (hereinafter referred to as "viewership"), user voting, etc. In another example, the popularity information may be obtained by determining the amount of chatter (e.g., a quantity of Internet-based discussion, articles and/or citations associated with television content) and/or viewer sentiment (e.g., a user's positive or negative impression of particular television content) occurring on the global network (e.g., via social networking websites, blogs, message boards, chat rooms, news wires, etc.) at a particular point in time and/or over a particular period of time. In yet another example, the popularity information may be obtained by performing a search, via a website containing a search engine (e.g., Google, Yahoo, etc.), to determine the quantity of information (e.g., quantity of hits, information sources, references, etc.) associated with particular television content at a particular point in time and/or over a particular period of time (e.g., specified from a particular start date to a particular end date). In still another example, popularity information may be obtained by determining the viewership of television content from video clients (e.g., set top boxes (STBs)) associated with the content delivery system.

Television content cloudlet 120 may include information associated with particular television content identified as a result of a program popularity operation. For example, the information associated with particular television content may include a title (e.g., TrueBlood), the particular channel (e.g., HBO (501)), and/or the time (e.g., 8:00 PM) at which the television content will be broadcast, and/or the duration of the broadcast or the time remaining if the broadcast is in progress. Additionally, or alternatively, the information associated with the particular television content may include an image associated with the television content and/or popularity information, associated with particular television content (e.g., "1." indicating that TrueBlood is the most popular television content in a particular time slot (8:00 pm)), obtained as a result of the program popularity operation described above.

Highlighted cloudlet 130 may include information as described above in cloudlet 120 and additionally, or alternatively, may include information and/or visual elements that distinguish the cloudlet from other, non-highlighted cloudlets. For example, highlighted cloudlet, corresponding to particular television content 130, may include different color schemes than non-highlighted cloudlets, may include dimensions that are larger than dimensions of non-highlighted cloudlets, may include larger and/or different fonts than non-highlighted cloudlets, and/or may include additional, different, and/or differently arranged information compared with non-highlighted cloudlets. In another example, highlighted cloudlet, corresponding to particular television content 130, may include information associated with parental controls (e.g., TV 14), a short description of the particular television content (e.g., "A hostage situation pushes CTU to the brink"), and/or a button or data item (e.g., "More>>") that permits the user to view additional information, via an enhanced cloud activity guide (not shown in FIG. 1), associated with the particular television content.

Cloud feed cloudlet 140 may include information, associated with particular television content and/or performers obtained from cloud feeds specified by the user, such as social networking websites (e.g., Twitter, Facebook, Myspace, etc.), news websites (e.g., FOX, ABC, TV Guide, etc.), and/or message board websites (e.g., discussion groups, blogs, chat rooms, etc.). For example, the guide application may communicate with a website as specified by the user and/or set by the guide application and may receive information associated with television content and/or performers associated with television content displayed in program popularity cloudlet 110 and/or other television content.

Search cloudlet 150 may include a data field in which the user may enter a query to perform a search associated with television content, a favorite performer, or some other search. A search, based on the query, may be performed using a third party search engine (e.g., Google, Yahoo, etc.) and/or by the guide application.

Performer popularity cloudlet 160 may include information associated with the relative popularity of a performer (e.g., an actor, an actress, a musician, a singer, a director, a producer, etc.) or set of performers. For example, the information associated with the relative popularity of the performer may be obtained as a result of a performer popularity operation in which the guide application may communicate with websites specified by the user and/or set by the guide application, to obtain popularity information associated with the performer. In one example, the popularity information may be obtained from websites that provide information associated with the quantity of searches and/or inquiries, associated with the performer, received by the website. In another example, the popularity information may be obtained by determining the amount of chatter (e.g., discussion regarding a particular performer) and/or viewer sentiment (e.g., a user's positive or negative impression of the performer) occurring on the Internet (e.g., via social networking websites, blogs, message boards, chat rooms, news wires, etc.) at a particular point in time and/or over a particular period of time. In yet another example, the popularity information may be obtained by performing a search, via a website containing a search engine (e.g., Google, Yahoo, etc.), to determine the quantity of information (e.g., quantity of hits, information sources, references, etc.) associated with the performer at a particular point in time and/or over a particular period of time (e.g., specified from a particular start date to a particular end date).

Friends cloudlet 170 may include information associated with friends (e.g., users associated with other video client devices), established via the guide application and/or via a social networking website. Friends cloudlet 170 may permit users to communicate with friends via instant messaging (IM) and/or by participating in polls with friends regarding television content, performers, etc. For example, the guide application may communicate with social networking websites to obtain information associated with friends identified by the user. In another example, the guide application may display a particular friend, associated with another video client device, when it is determined that a friend is viewing particular television content that the user is reviewing. In yet another example, the guide application may display friends identified by the user during the set up process and/or if the user is identified by another user.

While FIG. 1 illustrates a cloud activity guide that includes cloudlets 110 through 170, in another implementation, the cloud activity guide may include fewer cloudlets, additional cloudlets, different cloudlets, or differently arranged cloudlets than are described with respect to FIG. 1.

Figure 2:
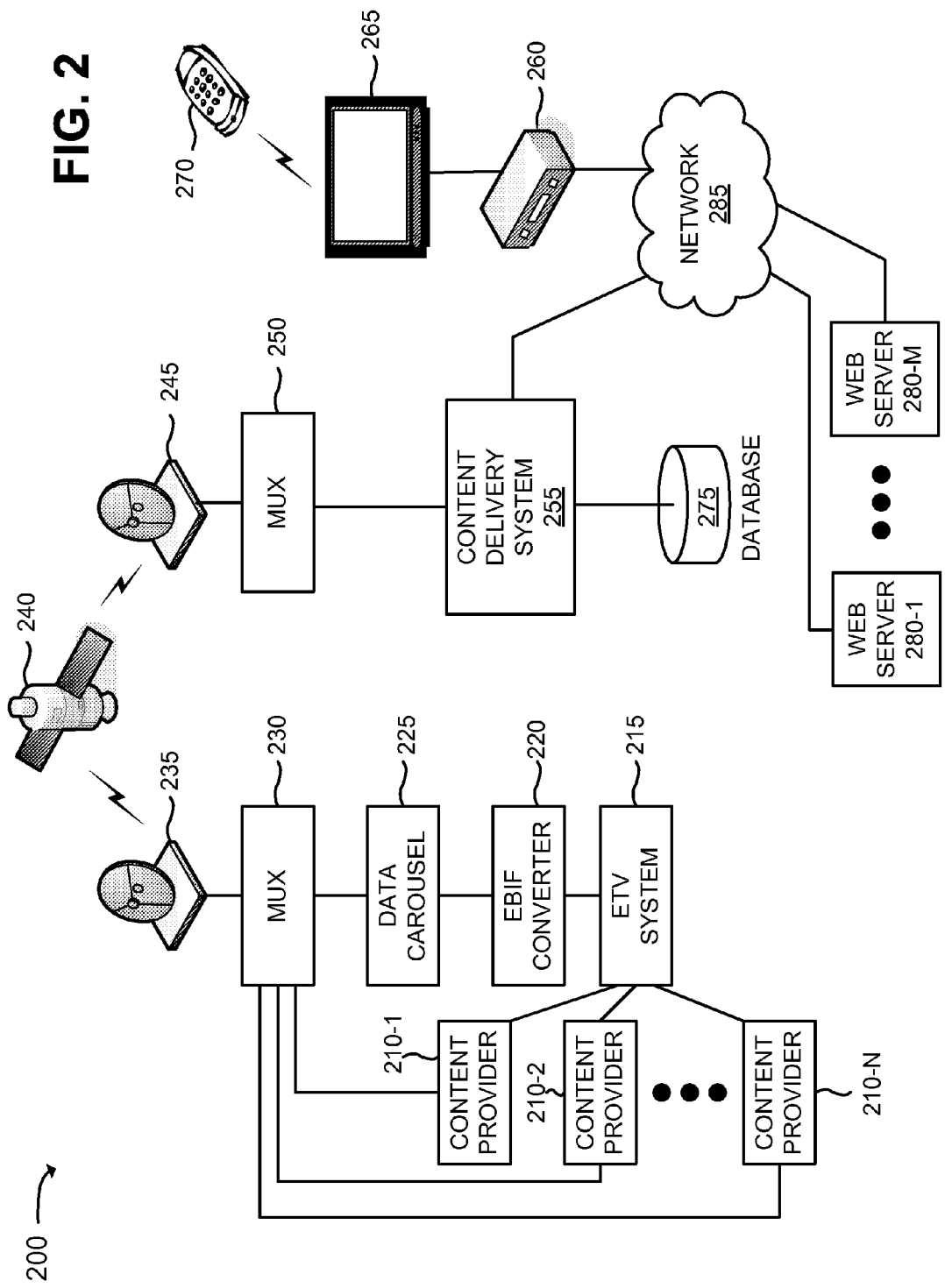
FIG. 2 is a diagram of an exemplary network in which systems and/or methods described herein may be implemented.

FIG. 2 is a diagram of an exemplary environment 200 in which systems and/or methods described herein may be implemented. As shown in FIG. 2, environment 200 may include television content providers 210-1, 210-2, ..., 210-N (where N≧1) (collectively referred to as "content providers 210" and individually as "content provider 210"), Enhanced Television (ETV) system 215, Enhanced TV Binary Interchange Format (EBIF) converter 220, data carousel 225, multiplexer (MUX) 230, satellite uplink 235, satellite 240, satellite downlink 245, MUX 250, content delivery system 255, video client 260, video display device 265, remote control 270, database 275, web servers 280-1, ..., 280-M (where M≧1) (hereinafter collectively referred to as "web servers 280" and individually as "web server 280"), and network 285. In practice, environment 200 may include additional devices, fewer devices, different devices, or differently arranged devices than are shown in FIG. 2. For example, environment 200 may include a transmission medium that includes devices other than satellites and satellite uplinks and downlinks.

Also, two or more of the devices, of FIG. 2, may be implemented within a single device, or a single device may be implemented as multiple, distributed devices. Further, while FIG. 2 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 210 may include any type or form of content providers that provide media streams. For example, content providers 210 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Hulu, Veoh, Joost, YouTube, etc.). In this example, content providers 210 may host third party websites such as social networking websites (e.g., Twitter, Facebook, Myspace, etc.), blog websites, news wire websites (e.g., AP, UPI, Reuters, etc.), search engine websites (e.g., Google, Yahoo, inc.), third party ratings and/or review websites (e.g., Neilson, Sysomos Solutions, IMDb, TV Guide, etc.), message board websites, etc. that may produce media streams. A "media stream," as used herein, may refer to a stream of content that includes video content, audio content and/or text content.

ETV system 215 may include a device that may work with content providers 210 to generate interactive content for the media streams. ETV system 215 may acquire, decode, and/or present information, and execute actions contained in an EBIF signal in order to present an interactive multimedia page for display to a user. For example, ETV system 215 may generate interactive content and associated signaling information (e.g., triggers) that are associated with the media streams. EBIF converter 220 may include a device that processes the interactive content and associated signaling information to conform to the EBIF standard. EBIF converter 220 may output EBIF-compliant content and signaling information. Data carousel 225 may include a device that processes the EBIF-compliant content and signaling information to generate multiple data carousels on multiple separate data packet identifiers (PIDs) as part of an MPEG-2 single program transport stream (SPTS). For example, a first PID may contain EBIF-compliant content and a second PID may contain the signaling information.

MUX 230 may include a multiplexer device that receives the media streams from content providers 210 and the EBIF-compliant content and associated signaling information from data carousel 225 and multiplexes or otherwise combines this data to create an enhanced media stream. Satellite uplink 235 may include a satellite transmitter that receives the enhanced media stream, processes the enhanced media stream for transmission, and transmits the enhanced media stream to satellite 240. Satellite 240 may include a stationary or orbiting communication satellite that receives the enhanced media stream and relays the enhanced media stream to satellite downlink 245.

Satellite downlink 245 may include a satellite receiver that receives the enhanced media stream from satellite 240, processes the enhanced media stream for transmission, and transmits the enhanced media stream to MUX 250. MUX 250 may include a multiplexer device that processes the enhanced media stream for transmission to content delivery system 255.

Content delivery system 255 may include a server device, or a collection of server devices, that receives the enhanced media stream and processes the enhanced media stream for transmission, according a particular protocol, such as the asynchronous serial interface (ASI) format, to a user's equipment (e.g., video client 260). Content delivery system 255 may include a service adaptor component and a media relay component. The service adaptor component may control what information (e.g., what video programs and/or advertisements) to provide to which users based, for example, on user subscriptions and/or profiles. In another implementation, content delivery system 255 may host a guide application that may enable content delivery system 255 to perform cloud activity guide operations. Content delivery system 255 may receive settings information (e.g., specified by the user), associated with the guide application, from video client 260 and/or may store the settings information in database 275. Content delivery system 255 may communicate with one or more other devices, such as content providers 210 and/or video client 260 when performing a cloud activity guide operation to obtain popularity information, ratings information, review information and/or chatter information associated with television content and/or with a performer. Content delivery system 255 may receive chatter information associated with television content and/or a performer from content providers 210 and may determine the relative popularity of the television content and/or a performer compared with other television content and/or other performers, respectively. Content delivery system 255 may generate queries, based on television content and/or a performer specified by the user of video client 260 and may communicate with content providers 210 to perform searches based on the generated queries to determine the popularity of the television content and/or the performer. Content delivery system 255 may present information obtained from the cloud activity guide operation to video client 260 for display on video display device 265.

The media relay component may control the transmission of the information to the users (e.g., video clients 260). The media relay component may perform multiplexing, demultiplexing, encoding, and/or encryption functions. The media relay component may include a multiplexer and/or modulator component that performs some form of modulation on the enhanced media stream, such as quadrature amplitude modulation (QAM).

Video client 260 may include a device that can receive and process the enhanced media stream from content delivery system 255. In one implementation, video client 260 may take the form of a STB. In another implementation, video client 260 may include a computer device, a cable card, a communication device (e.g., a telephone, such as a voice over Internet protocol (VoIP) telephone or a mobile telephone, or a personal digital assistant (PDA)), or the like.

Video client 260 may perform decoding and/or decryption functions on the enhanced media stream received from content delivery system 255. Video client 260 may receive information, associated with cloud activity guide operations, and may present the information and a cloud activity guide user interface to video display device 265.

Video display device 265 may include any device capable of receiving and/or reproducing video and/or audio signals. In one implementation, video display device 265 may take the form of a television. In another implementation, video display device 265 may include a computer monitor, a display of a communication device (e.g., a telephone, such as a VoIP telephone or a mobile telephone, or a PDA), or the like. Video display device 265 may be connected to video client 260 and may receive signals, from video client 260, containing television content for display.

Remote control 270 may include any device capable of remotely controlling the operation of video client 260 and/or video display device 265. Remote control 270 may take the form of a remote control device similar to a television or STB remote control device, a game controller, a keyboard, a keypad, a mouse, a PDA, a mobile telephone, or the like. Remote control 270 may provide commands to video client 260 and/or video display device 265 by transmitting signals, such as wireless signals (e.g., infrared or Bluetooth) or signals transmitted over wires (e.g., over a universal serial bus (USB) interface or the like), to a receiver associated with video client 260 and/or video display device 265.

Database 275 may include a device to write, read, and/or store information. For example, database 275 may store settings, specified by the user, associated with a cloud activity guide. Database 275 may receive updated user preferences information from content delivery system 255 that enable content delivery system 255 to track viewing habits associated with the user of video client 260. In another example, database 275 may store popularity information associated with a performer or television content that may serve as a basis to determine changes in popularity at another point in time.

Web servers 280 may include one or more server devices, or other types of computation or communication devices, that gather, process, search, store, and/or provide information in a manner similar to that described herein. Web servers 280 may interface with content delivery system 255 via network 285. Web servers 280 may host Internet-based websites, such as social networking websites (e.g., Twitter, Facebook, Myspace, etc.), blog websites, news wire websites (e.g., AP, UPI, Reuters, etc.), search engine websites (e.g., Google, Yahoo, inc.), third party ratings and/or review websites (e.g., Neilson, Sysomos Solutions, IMDb, TV Guide, etc.), message board websites, etc. Web servers 280 may communicate with content delivery system 255 and may send popularity information associated with television content and/or a performer as indicated by content delivery system 255. Web servers 280 may perform searches based on queries received from content delivery system 255. Web servers 280 may retrieve information (e.g., top 50 television programs, top 25 performers, top 10 box office movies, etc.), based on requests received from content delivery system 255, and may send the information to content delivery system 255.

Network 285 may include a single network or multiple networks. For example, network 285 may include a video signaling and distribution network, such as a fiber optic network, to distribute information and/or television content from content delivery system 255. Additionally, or alternatively, network 285 may take the form of a wide area network, a local area network, an intranet, or a telephone network (e.g., the Public Switched Telephone Network or a cellular network). In another example, network 285 may include a broadband and/or global network, such as the Internet.

Figure 3:
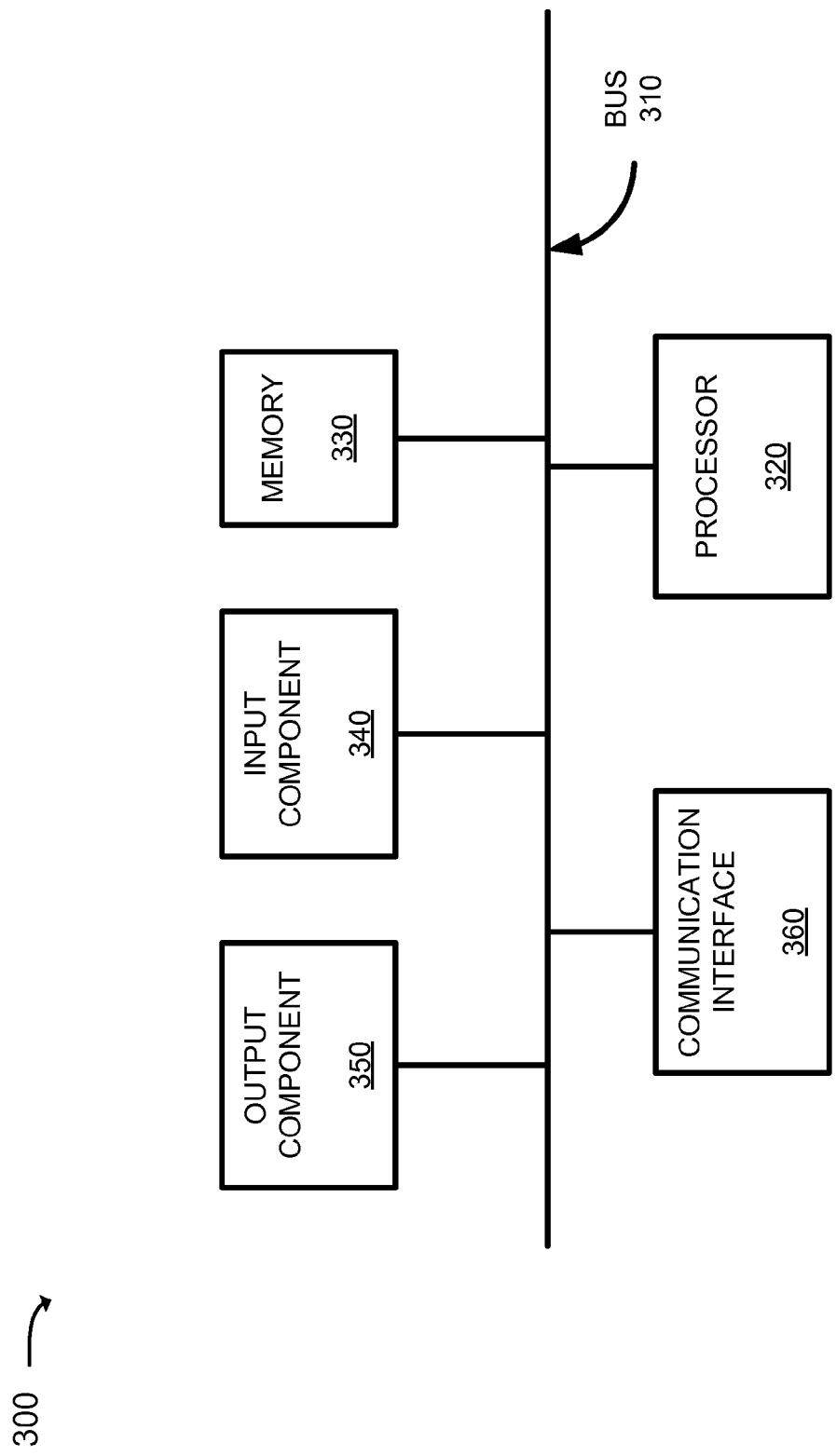
FIG. 3 is a diagram of exemplary components of one or more of the devices of FIG. 2.

FIG. 3 is a diagram of exemplary components of a device 300 that may be associated with a content provider 210, content delivery system 255, video client 260, video display device 265, remote control 270 and/or web server 280. Device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, or the like.

As will be described in detail below, device 300 may perform certain operations (e.g., cloud activity guide operations) relating to a cloud activity guide. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
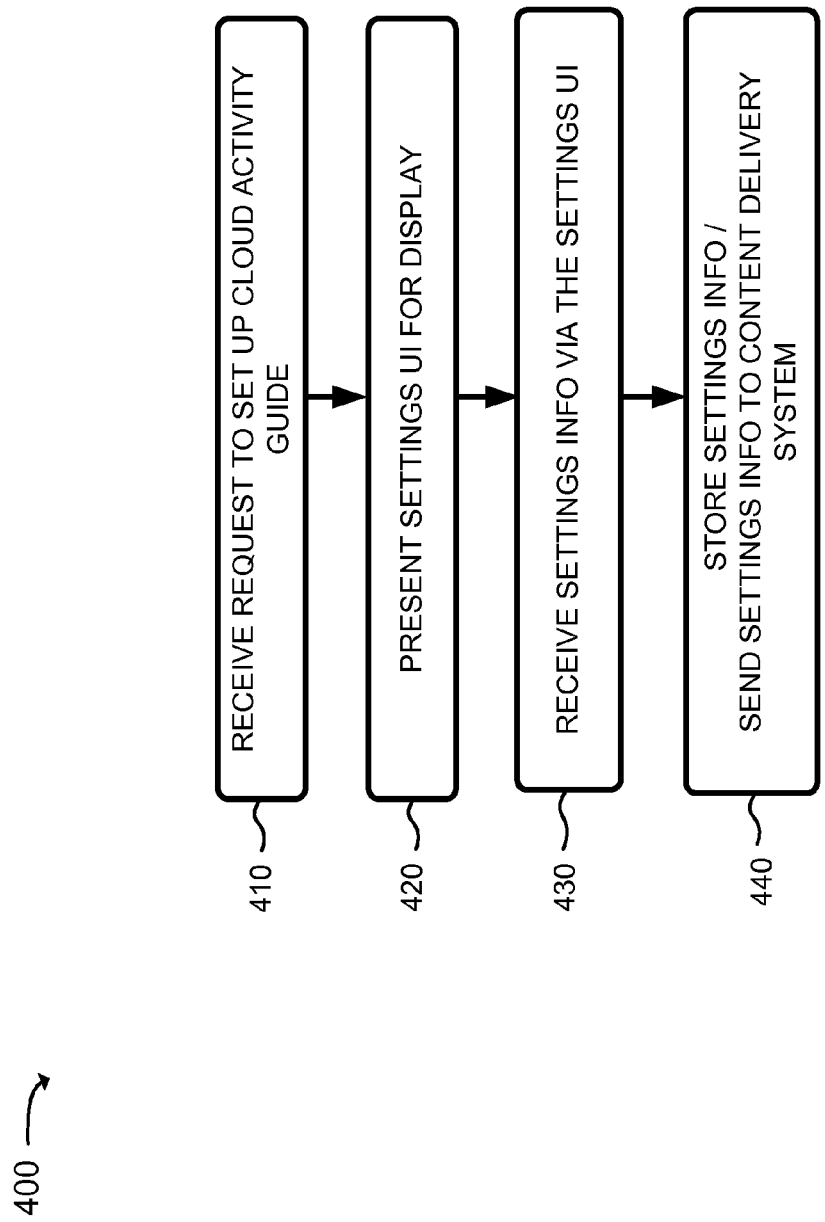
FIG. 4 is a flowchart of an exemplary process for specifying cloud activity guide settings information within an exemplary portion of the network of FIG. 2.
Figure 5:
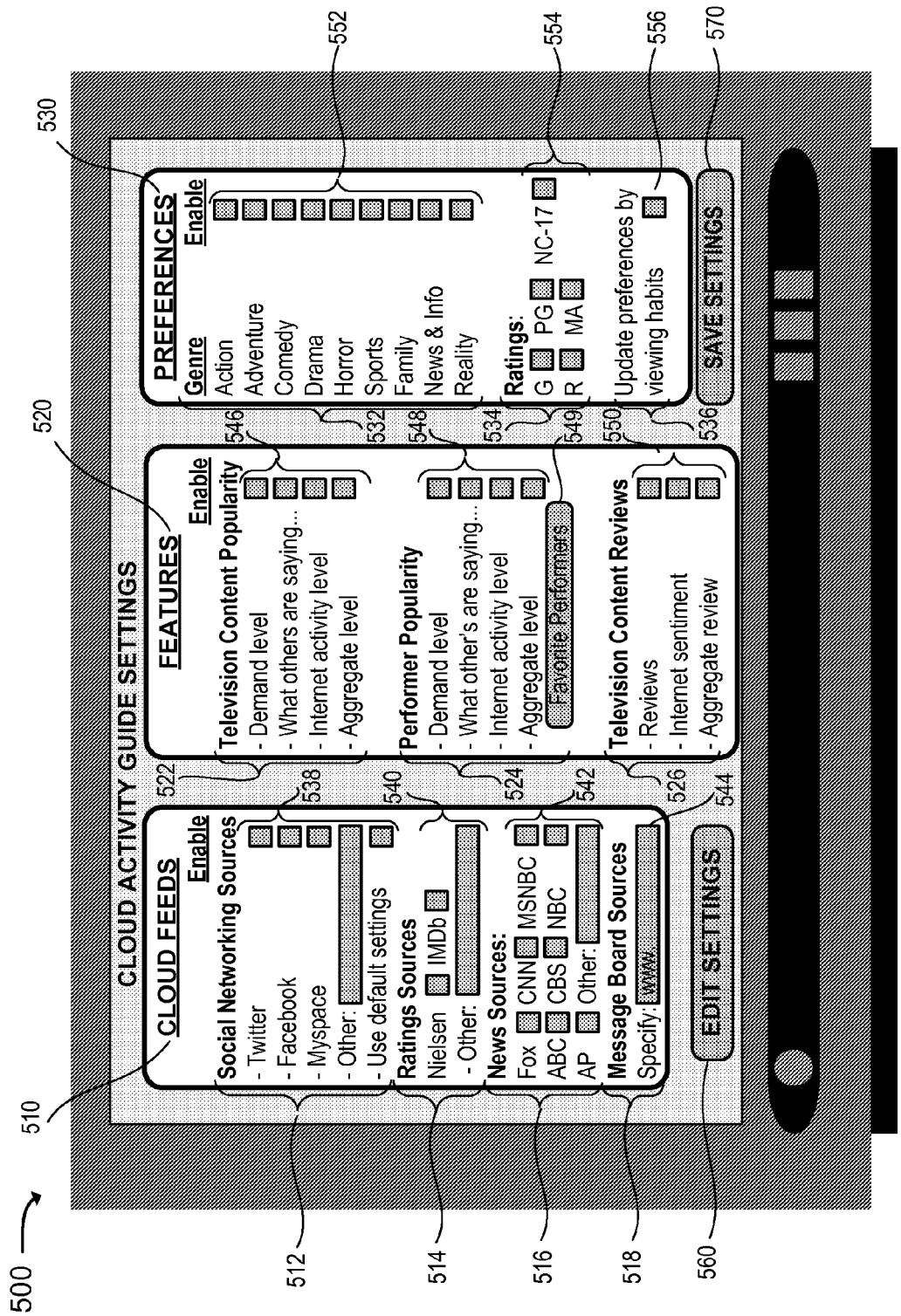
FIG. 5 is a diagram of an exemplary cloud activity guide settings user interface that is capable of being presented on the video display device of FIG. 2.

FIG. 4 is a flowchart of an exemplary process 400 for specifying cloud activity guide settings information within an exemplary portion of environment 200. In one implementation, process 400 may be performed by video client 260. In another implementation, some or all of process 400 may be performed by a device or collection of devices separate from, or in combination with, video client 260. FIG. 5 is a diagram of an exemplary cloud activity guide settings user interface 500 that is capable of being generated by video client 260 of FIG. 2. A portion of process 400, of FIG. 4, will be discussed below with corresponding references to cloud activity guide settings user interface 500 shown in FIG. 5.

Process 400 of FIG. 4 may include receiving a request to set up a cloud activity guide (block 410). For example, a user, of video client 260, may desire to set up a cloud activity guide and may request to set up the cloud activity guide by pressing a particular button, or combination of buttons, on remote control 270. Video client 260 may receive the request and may retrieve information associated with a cloud activity guide settings user interface (e.g., cloud activity guide settings user interface 500, of FIG. 5) (hereinafter referred to as "settings user interface 500") from a memory (e.g., a memory associated with video client 260).

A settings user interface may be presented for display (block 420). For example, video client 260 may present the information associated with the settings user interface (e.g., settings user interface 500 of FIG. 5), retrieved from the memory, to video display device 265 for display. In this example, settings user interface 500 may include cloud feeds cloudlet 510, features cloudlet 520, and/or preferences cloudlet 530.

While FIG. 5 illustrates settings information that includes cloudlets 510 through 530, in another implementation, settings information may include fewer cloudlets, additional cloudlets, different cloudlets, or differently arranged cloudlets than are described with respect to FIG. 5.

For example, cloud feeds cloudlet 510, may include information regarding cloud feeds from which data may be received (e.g., from content providers 210) and/or obtained (e.g., from websites hosted by web servers 280) by the guide application in order to perform cloud activity guide operations. For example, cloud feeds cloudlet 510 may include social networking sources data items 512, rating sources data items 514, news sources data items 516, message board sources data items 518 and/or other data items. In this example, social networking sources data item 512 may include cloud feeds, such as feeds from Internet-based websites (e.g., Twitter, Facebook, Myspace, etc.) and/or social networking websites that the user may specify. Ratings sources data item 514 may include websites (e.g., Nielsen Online, IMDb, TV Guide, etc.) specializing in determining ratings associated with viewership (e.g., the quantity of users watching particular television content), box office sales volume, video sales volume, video rental volume, etc. associated with television content. News sources data item 516 may include information regarding free television broadcast networks (e.g., ABC, Fox, etc.); for-pay television broadcast networks (e.g., Cinemax, ESPN, etc.), news wires (e.g., AP, UPI, Reuters, etc.), and/or other new sources (e.g., the Drudge Report, online print media websites, etc.) that may be specified by the user. Message board data item 518 may include Internet-based open-text forums, such as websites hosting chat rooms, message boards, discussion groups, social networking discussions, blogs, etc.

Features cloudlet 520 may permit the user to view the popularity of particular television content, the popularity of a particular performer, and/or the reviews associated with the particular television content and/or associated with a particular performer. For example, features cloudlet 520 may include television content popularity data item 522, performer popularity data item 524, television content reviews data item 526, and/or other feature settings (not shown in FIG. 5).

In this example, television content popularity data item 522 may permit the user to view popularity information associated with television content based on the viewership, sales, rentals, etc. associated with television content (e.g., demand level) and/or whether the popularity associated with the television content is increasing, is neutral, or is decreasing. In another example, television content popularity data item 522 may permit the user to view cloud feeds, associated with the television content (e.g., What others are saying . . . ), from social networking websites, news sources, message boards, blogs, chat rooms, and/or other cloud feeds specified by the user in cloudlet 510 and/or set by the guide application. In yet another example, television content popularity data item 522 may include a feature (e.g., Internet activity level) that permits the user to view the relative popularity of television content based on the amount of chatter present on the Internet (e.g., network 285) at a particular point in time and/or over a particular period of time. In still another example, television content popularity data item 522 may include a feature (e.g., Aggregate level) that permits the user to view the popularity of television content based on a combination of factors identified in television content popularity data item 522 and/or other factors.

Performer popularity data item 524 may permit the user to view the demand associated with performers, such as actors, actresses, musicians, directors, producers, etc. that are listed in top performer charts by particular websites (e.g., IMDb, TV Guide, etc.). In another example, performer popularity data item 524 may permit the user to view cloud feed information associated with a particular performer (e.g., what others are saying . . . ) as described above with respect to television content popularity data item 522. In yet another example, performer popularity data item 524 may permit the user to view the relative popularity of a performer or group of performers based on the amount of chatter present on the Internet (e.g., network 285) and/or the number of searches for a particular performer (e.g., Internet activity level) at a particular point in time and/or over a particular period of time (e.g., specified from a particular start date to a particular end date). In still another example, performer popularity data item 524 may permit the user to view the popularity of a performer or group of performers based on a combination of factors (e.g., aggregate level) identified in performer popularity data item 524 and/or other factors.

Television content reviews data item 526 may permit the user to view articles, ratings two out of four stars, thumbs up, 65 out of 100, etc.) and/or other commentary (e.g., reviews), authored by critics and/or users in various forms of media, such as print media, entertainment channels (e.g., E!, Entertainment Weekly, etc.), blogs, etc., of television content and/or of performers. In another example, television content reviews data item 526 may include a feature (e.g., Internet sentiment) that permits the user to view the general sentiment (e.g., a positive review, neutral review, or negative review) associated with particular television content based on the chatter over the Internet (e.g., network 285) at a particular point in time and/or over a particular period of time (e.g., specified from a particular start date to a particular end date). Additionally, or alternatively, television content reviews data item 526 may include a feature (e.g., aggregate review) that permits the user to view the review of television content based on a combination of television content review features of television content reviews data item 526 and/or other features.

Preferences cloudlet 530 may permit the user to specify the preferred television content genres and/or ratings that the user prefers to view. For example, preferences cloudlet 530 may include a genre data item 532, ratings data item 534 and/or data item 536 associated with updating preference settings based on user viewing patterns and/or habits.

In this example, genre data item 532 may permit the user to specify preferred television content to view such as television content associated with action, adventure, comedy, etc. In another example, ratings data item 534 may permit the user to specify preferred television content ratings, such as ratings promulgated by the Motion Picture Association of America (MPAA) (e.g., G, PG, PG-13, R, and NC-17), the TV Parental Guidelines System (e.g., TV-Y, TV-Y7, TV-G, TV-PG, TV-14, and/or TV-MA) (not shown in FIG. 5) and/or pay television content descriptors (e.g., adult content (AC), adult language (AL), graphic language (GL), mild violence (MV), etc.) (not shown in FIG. 5). Data item 536, associated with updating preferences based on user viewing habits, may permit a user to enable the guide application to update settings information, specified via settings user interface 500, based on user viewing habits. For example, the guide application may update settings information to permit television content to be displayed based on the television content that the user actually watches and/or records and/or that is similar to the television content that the user actually watches and/or records. In another example, the user may perform a search for particular television content and/or communicate with a social networking website regarding the particular television content and the guide application may update settings information to permit television content to be displayed based on the search and/or communications with social networking websites and/or other sites.

Other cloudlets and/or settings information may be specified by the user that are not shown in FIG. 5. In one example, the manner in which information is displayed, via the cloud activity guide, may be specified by the user. In this example, the user may define the quantity of areas, cloudlets or partitions, within the cloud activity guide, via which information is to be displayed. In another example, the user may specify what type of information is to be presented in each area. For example, the user may specify three cloudlets to display information in which the first cloudlet contains television content popularity information, the second cloudlet may include performer popularity information and the third cloudlet may contain television content review information. In another example, the user may specify five cloudlets to display information in which cloudlets one through three are as described above, the fourth cloudlet may include cloud feed information associated with a social networking website and the fifth cloudlet may include a field via which a search may be performed.

While FIG. 5 illustrates settings information that includes data items 512-518, 522-526, 532-536, 538-544, and/or 546-550, in another implementation, settings information may include fewer data items, additional data items, different data items, or differently arranged data items than are described with respect to FIG. 5.

Settings information may be received via the settings user interface (block 430). The user may specify desired cloud feeds 510 of FIG. 5. For example, the user may receive information from a particular social networking website, such as discussions associated with television content and/or performers by "selecting" a particular social networking website (e.g., Twitter, Facebook, Myspace, etc.) by placing an "X" in box 538 corresponding to the desired social networking website. Additionally, or alternatively, the user may specify a particular social website by entering information associated with the other social networking website (e.g., a website address, etc.). Additionally, or alternatively, the user may enable the guide application to select social networking sources by selecting box 538 corresponding to use default settings. If the user does not desire to receive information from social networking websites, then the user may not select any boxes 538.

In another implementation, the user may enter user information (e.g., username, password, personal identification number (PIN)) associated with a social networking website to which the user has subscribed and the user information may be stored by video client 260 and/or content delivery system 255.

The user may receive ratings information and/or news associated with television content and/or a particular performer by selecting box 540 corresponding to the desired ratings source data item 514 (e.g., Nielsen Online, etc.) and/or by selecting box 542 corresponding to the desired news source data item 516 (e.g., Fox, ABC, etc.). Additionally, or alternatively, the user may elect to specify a particular ratings source and/or a particular news source by entering information associated with the particular ratings source and/or by entering information associated with the particular news source, respectively. If the user does not desire to receive ratings information and/or information from news sources, then the user may not select any boxes 540 and/or boxes 542 corresponding to ratings sources data item 514 and/or to news sources data item 516, respectively.

The user may specify features settings 520 of FIG. 5. For example, the user may enable the desired television content popularity features by selecting box 546 corresponding to the desired content popularity data items 522, which may cause the guide application to perform program popularity operations to obtain program popularity information corresponding to the enabled television content popularity features. Alternatively, if the user does not desire to enable any television content popularity features, then the user may not select any boxes 546 corresponding to television content popularity data items 522.

In another example, the user may enable the desired performer popularity features by selecting box 548 corresponding to the desired performer popularity data items 524, which may cause the guide application to perform performer popularity operations, to obtain performer popularity information, corresponding to the enabled performer popularity features. Alternatively, if the user does not desire to enable any performer popularity features, then the user may not select any boxes 548 corresponding to performer popularity data items 524.

In yet another example, the user may enable the desired television content review features by selecting box 550 corresponding to the desired television content reviews data item 526, which may cause the guide application to perform program review operations to obtain and/or display program review information corresponding to the enabled television content review features. Alternatively, if the user does not desire to enable any television content review features, then the user may not select any boxes 550 corresponding to television content review data items 526.

The user may specify preferences settings 530 of FIG. 5. For example, the user may specify the desired television content genre preferences by selecting each box 552 corresponding to each desired genre in genre data item 532, which may cause the guide application to display television content corresponding to the specified genres. Alternatively, if the user does not desire to specify any genre preferences, then the user may not select any boxes 552 corresponding to genre data items 532.

In another example, the user may specify the desired television content ratings preferences by selecting each box 554 corresponding to the desired ratings associated with ratings data item 534, which may cause the guide application to display television content corresponding to the specified ratings preferences. Alternatively, if the user does not specify any ratings preferences, then the guide application may display television content according to default preferences set by the guide application.

In yet another example, the user may enable settings information, specified by the user, to be updated based on user viewing habits by selecting box 556. Alternatively, if the user does not desire user preferences settings to be updated, then the user may not select box 556.

Settings information may be stored and settings information may be sent to the content delivery system (block 440).

For example, video client 260 may receive the settings information, via the settings user interface, when the user presses a particular button (e.g., save settings button 570) on the settings user interface (e.g., settings user interface 500 of FIG. 5). At a later point in time, the user may edit the settings information by pressing another button (e.g., edit settings button 560) on the settings user interface. Video client 260 may store the settings information in a memory associated with video client 260 and/or may send the settings information to content delivery system 255. Content delivery system 255 may receive the settings information and may store the settings information in database 275. In another example, content delivery system 255 may communicate with particular web servers 280 and/or content providers 210 to register to receive streaming media (e.g., streaming text, streaming audio, streaming video, etc.) associated with cloud feeds specified by the user in the settings information. Content delivery system 255 may receive the streaming media and may forward the streaming media to video client 260 when cloud activity guide operations are performed.

Figure 6B:
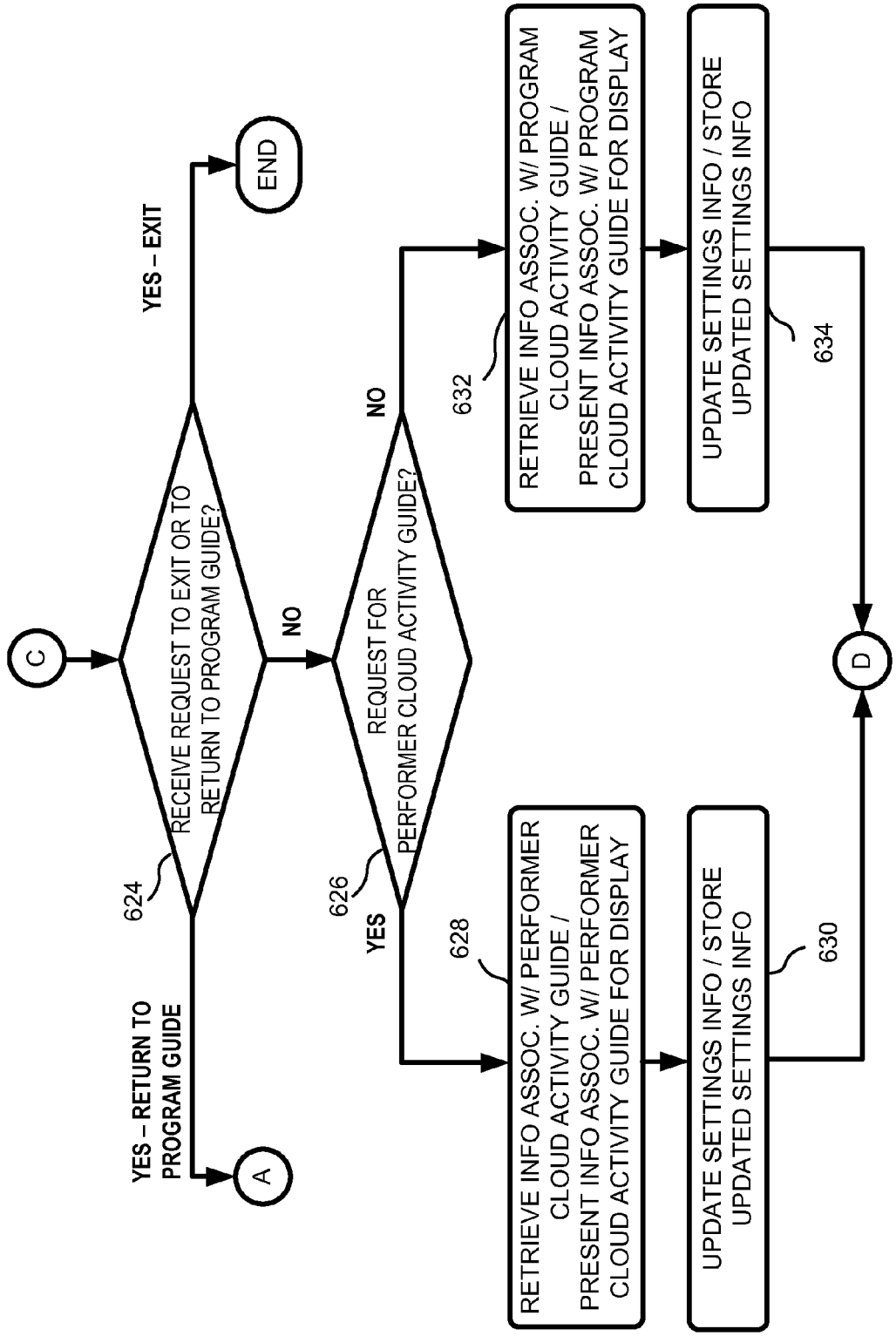
Figure 7A:
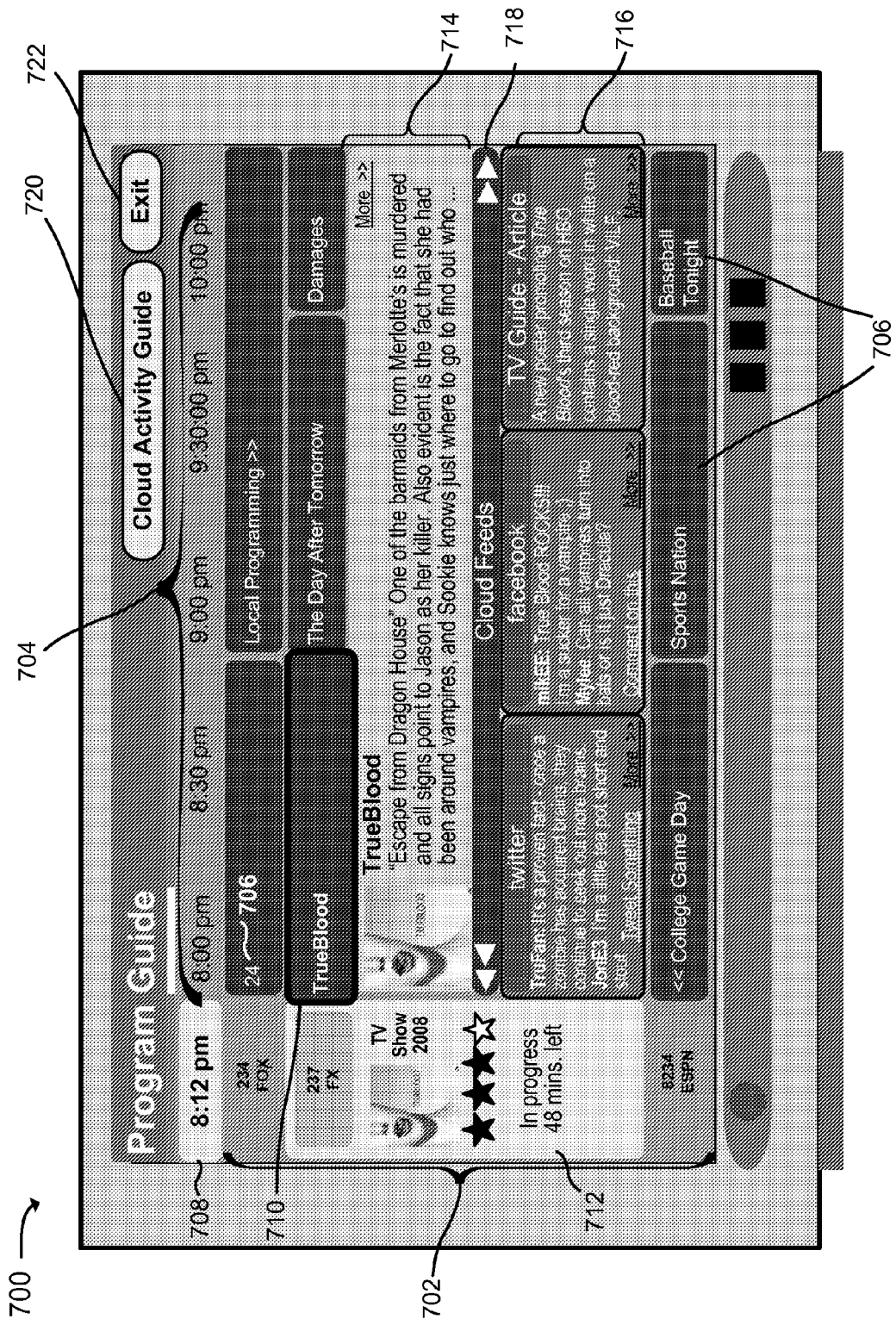
FIGS. 7A-7C are cloud activity guide user interfaces that are capable of being presented on the video display device of FIG. 2.
Figure 7B:
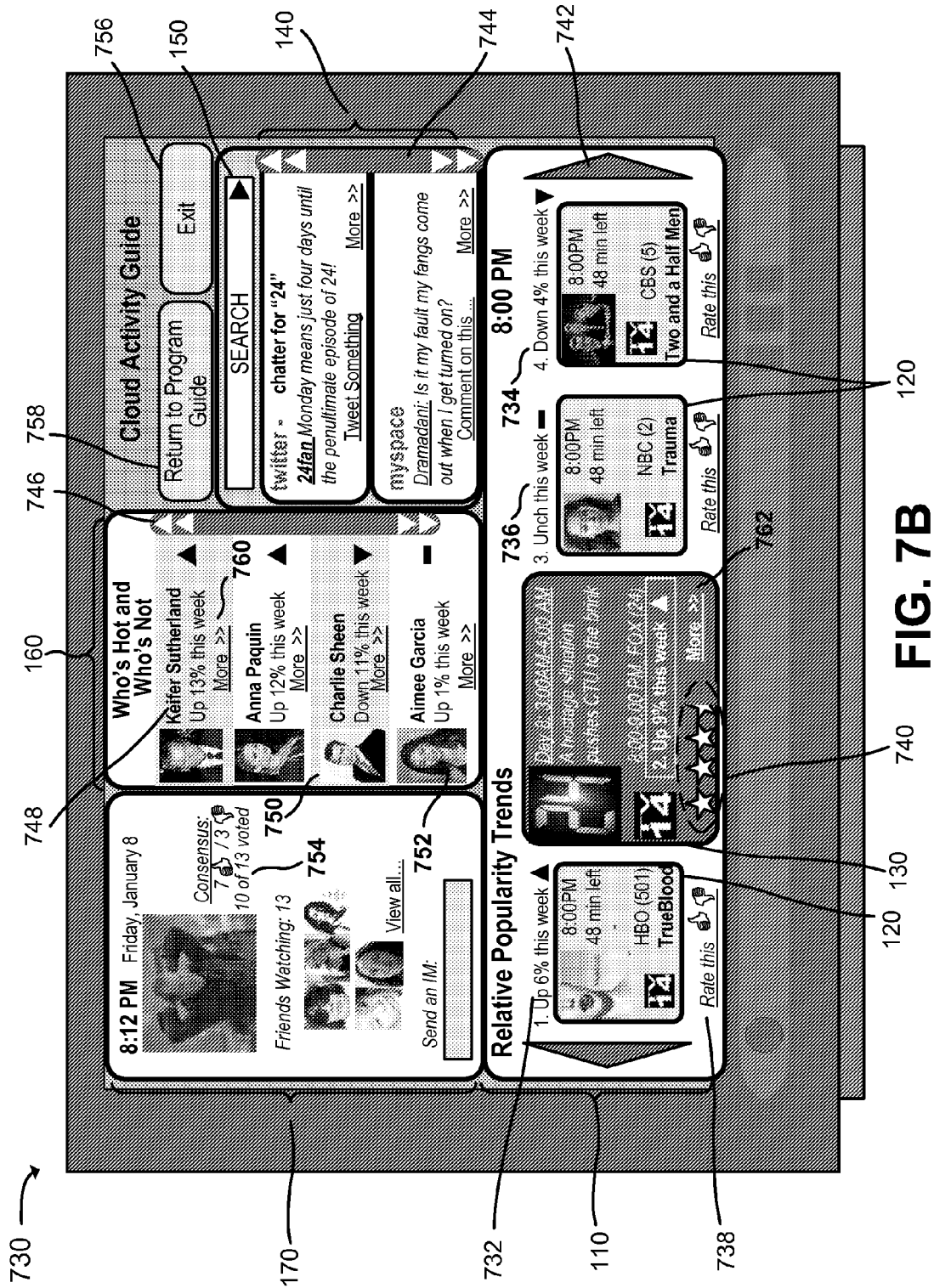
Figure 7C:
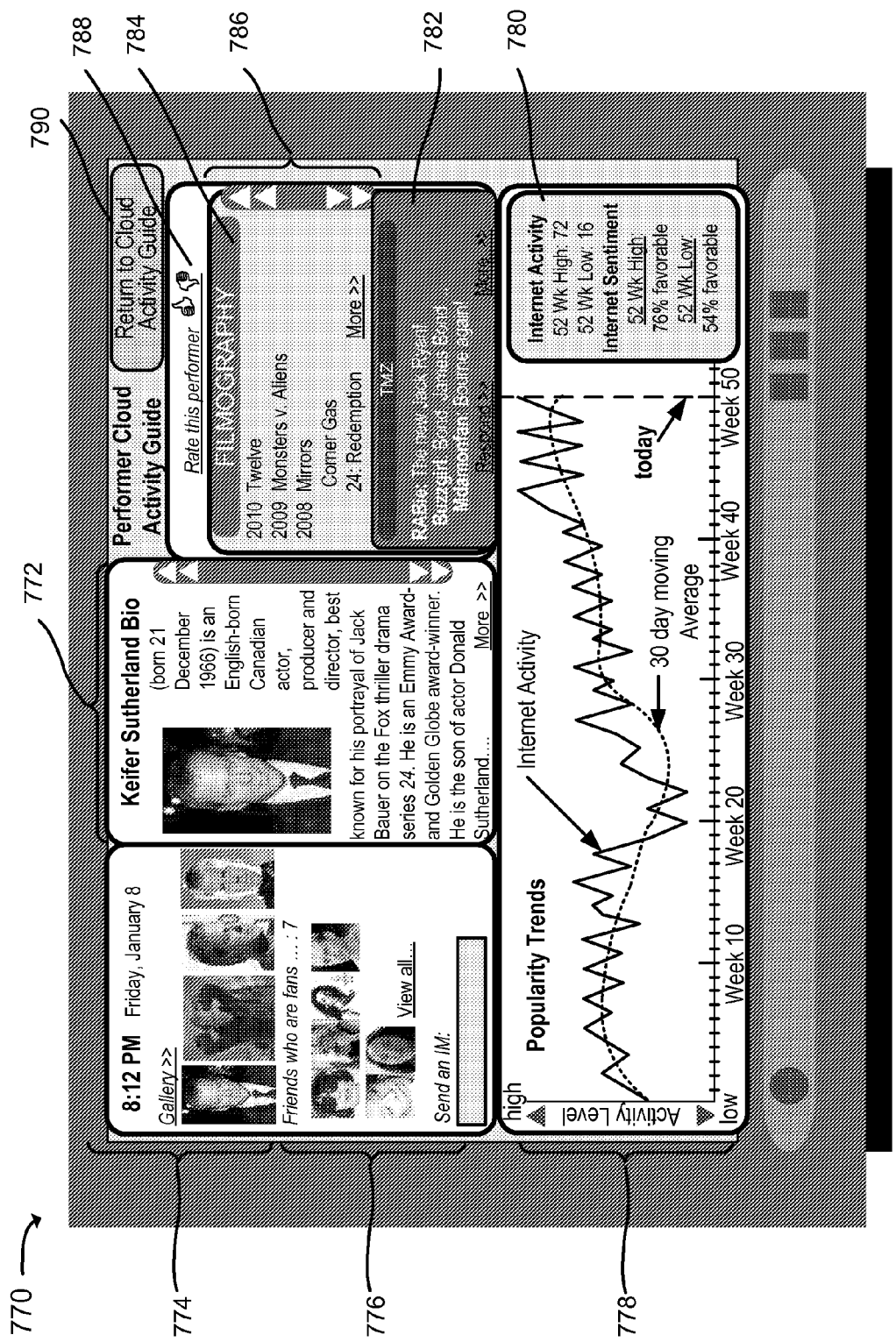

FIGS. 6A and 6B are flowcharts of an exemplary process 600 for using and interacting with a cloud activity guide within environment 200. In one implementation, process 600 may be performed by content delivery system 255 interfacing with video client 260 and/or web servers 280. In another implementation, some or all of process 600 may be performed by a device or collection of devices separate from, or in combination with, content delivery system 255. FIGS. 7A through 7C are cloud activity guide user interfaces that illustrate cloud activity guide operations within environment 200. A portion of process 600, of FIGS. 6A and 6B, will be discussed below with corresponding references to cloud activity guide user interfaces 700 through 760 shown in FIGS. 7A through 7C, respectively.

Process 600, of FIGS. 6A and 6B, may include receiving a request for cloud feed information associated with selected television content (block 602). Assume that the user of video client 260 has specified cloud activity guide settings information (hereinafter referred to as "settings information") in a manner similar to that described above with respect to blocks 410-440 of FIG. 4. For example, video client 260 may receive a request, from a user (e.g., a user of video client 260) to view interactive television content. Video client 260 may receive the request, may retrieve information associated with a program guide (e.g., program guide user interface 700 of FIG. 7A), and/or may present the information associated with the program guide for display on video display device 265.

In this example, as illustrated in FIG. 7A, program guide user interface 700 may include television channel list data item 702, broadcast time data item 704, television content data items 706, current time data item 708, selected television content data item 710, selected channel data item 712, description data item 714, cloud feed data items 716, cloud feed scroll bar 718, cloud activity guide button 720 and/or exit button 722. While FIG. 7A illustrates program guide information that includes data items 702 through 722, in another implementation, program guide information may include fewer data items, additional data items, different data items, or differently arranged data items than are described with respect to FIG. 7A.

Television channel list data item 702 may include a list of channels that corresponds to content providers 210 from which television content is received. Broadcast time data item 704 may include a list of times at which television content data items 706 (e.g., television shows, movies, news, sports, etc.), corresponding to each television channel in television channels list data item 702, may be broadcast by content providers 210.

Selected television content data item 710 may correspond to particular television content (e.g., "TrueBlood") selected by the user of video client 260 (e.g., by pressing a particular button on remote control 270). For example, video client 260 may receive the request to view information associated with selected television content and may retrieve, from memory (e.g., a memory associated with video client 260), information associated with selected television content for display (e.g., on video display device 265) as description data item 714 via program guide user interface 700. Additionally, or alternatively, video client 260 may send the request to content delivery system 255. The request may include information associated with the selected television content (e.g., title, channel, broadcast time, etc. associated with the selected television content), information associated with video client 260 (e.g., a device identifier, etc.), and/or information associated with the user (e.g., a username, password, PIN, etc.).

Settings information may be retrieved (block 604). For example, content delivery system 255 may receive the request and the guide application may retrieve settings information associated with video client 260 and/or the user. From the settings information, the guide application may determine which cloud feeds (e.g., cloud feeds 510 of FIG. 5) were specified by the user. For example, the user may have specified a social networking website (e.g., Twitter, Facebook, etc.), a particular news source (e.g., FOX, TV Guide, etc.), a message board (e.g., a particular chat room, discussion group, blog, etc.), or some other source.

Cloud feed information may be obtained and cloud feed information may be presented for display (block 606). For example, the guide application may communicate with web servers 280 that may host websites corresponding to cloud feeds specified by the user. In this example, the guide application may provide, to a particular website corresponding to a particular cloud feed, information associated with the selected television content and/or information associated with the user (e.g., username, password, PIN corresponding to the particular website). Content delivery system 255 may receive information, associated with the selected television content, from the particular website and may send the information to video client 260 for display on video display device 265 and via program guide 700 (e.g., shown as text within the Twitter, Facebook and TV Guide cloud feed data items 716). The cloud feed information may include text, images, video, and/or audio associated with the selected television content.

In another example, content delivery system 255 may perform a search for cloud feed information. For example, if the user specified cloud feed settings (e.g., by selecting default cloud feeds) that permit the guide application to determine the cloud feeds from which information associated with the selected television content will be obtained, then, in a manner similar to that described above, the guide application may communicate with a particular website to obtain the information. Additionally, or alternatively, the guide application may generate a query that includes information associated with the television content, keywords associated with cloud feeds (e.g., names, titles and/or keywords associated with blogs, discussion groups, articles, news, etc.) and may communicate with web server 280 that hosts a search engine (e.g., Google, Yahoo, etc.) to perform a search. The guide application may select a particular number of websites from the list of websites and/or other information returned from the search (e.g., top three, top five, top ten results, etc.) from which to receive information associated with the selected television content.

In another implementation, cloud feed information may be received from content provider 210. For example, content delivery system 255 may receive cloud feed information, from content provider 210, as streaming media (e.g., streaming text, streaming audio, streaming video, etc.) and may forward the cloud feed information to video client 260 for display on video client 260 via the program guide user interface.

The user may view the cloud feed information and may use scroll bar 718 to view cloud feed information not shown in FIG. 7A. Additionally, or alternatively, the user may view a cloud activity guide or may exit program guide user interface 700 (e.g., by using remote control 270 to scroll to cloud activity guide button 720 or to exit button 722 and/or by pressing a particular button on remote control 270).

A request to perform a cloud activity guide operation may be received (block 608). For example, the user may desire to view a cloud activity guide and may select a particular button on the program guide (e.g., cloud activity guide button 720 associated with program guide 700 of FIG. 7A) to view additional information associated with the selected television content (e.g., TrueBlood); other television content corresponding to different television channels with the same broadcast time (e.g., 24, College Gameday, etc.); other television content in the same genre as the selected television content; other television content of a genre (e.g., genre data item 532 of FIG. 5) specified by the user (e.g., action, adventure, comedy, etc.); and/or other television content that does not exceed a rating specified by the user (e.g., ratings data item 534 of FIG. 5). Additionally, or alternatively, the user may desire to view information regarding performers associated with the selected television content and/or information regarding performers associated with other television content. Video client 260 may receive a request, from the user, to view a cloud activity guide and may send the request to content delivery system 255. The request may include information associated with the selected television content (e.g., title, television channel, date and time of broadcast, etc.), other television content and/or performers; information associated with video client 260 (e.g., a device identifier); and/or information associated with the user (e.g., username, password, PIN, etc.).

If any television content popularity features are enabled (block 610—YES), then a program popularity operation may be performed (block 612). For example, content delivery system 255 may receive the request and the guide application may determine whether any television content popularity features 520 of FIG. 5 have been enabled. In this example, the guide application may, in a manner similar to that described above (with respect to block 606), communicate with web server 280 to retrieve cloud feed information associated with the selected television content and/or other television content associated with a particular broadcast time (e.g., the broadcast time of the selected television content), when the guide application determines that the user has enabled a particular feature corresponding to television content data item 522 (e.g., what others are saying) (FIG. 5). The guide application may send the cloud feed information, associated with the particular performer, to video client 260.

A program popularity operation to determine the demand associated with television content may be performed. For example, the guide application may determine the demand for the selected television content when the guide application determines that the user has enabled a particular feature corresponding to television content demand data item 522 (e.g. demand level) (FIG. 5). In this example, the guide application may communicate with web servers 280, that host particular websites (e.g., IMDB, TV Guide, Nielson Ratings, etc.) that contain content, such as popularity charts (e.g., top movies, top television viewership rankings, top box office sales, etc.), to obtain program popularity information, associated with the selected television content, based on demand. In another example, the guide application may monitor user viewership, associated with the selected television content, based on the number of users, associated with video clients 260 with which content delivery system 255 is connected, that are watching the selected television content or have watched the selected television content at some prior point in time. The guide application may use the information, received from web server 280, to determine the relative popularity of television content, such as by ranking the selected television content against other television content based on the amount of demand.

A program popularity operation to determine an Internet activity level, associated with television content, may be performed. For example, the guide application may determine the amount of chatter on a global network, such as the Internet (e.g., network 285), associated with the selected television content, when the guide application determines that the user has enabled a particular feature associated with data item 522 (e.g., Internet activity level) (FIG. 5). In this example, the guide application may communicate with web server 280 that hosts a website that permits access to a proprietary search engine (e.g., Google, Yahoo, etc.) or some other search engine. The guide application may generate a search query for the selected television content that may include a title, television channel information, a particular point in time (e.g., a time that corresponds with a particular broadcast) and/or a particular period of time (e.g., a period of time corresponding to a season or set of seasons over which the particular television content was broadcast and/or a period of time specified from a particular start date to a particular end date), etc. The guide application may conduct a search, via the search engine, to determine the quantity of results associated with the selected television content based on the search query. For example a search, at a particular point in time, involving the television series "24," may yield, for example, approximately 359,000,000 search results. In another example, a search involving the television series "TrueBlood" may yield, for example, approximately 15,300,000 search results.

In another example, the guide application may communicate with a web server 280 that hosts a website that includes, or permits access to, proprietary tools and/or methods that track the quantity of searches performed for a particular topic (e.g., Google Trends, etc.), based on a search query. The guide application may generate a search query, similar to that described above, and may receive information associated with a search volume for the particular television content.

In yet another example, content delivery system 255 may communicate with web server 280 that hosts a website that includes, or permits access to, proprietary methods or tools that are capable of measuring Internet chatter associated with the particular television content. In this example, the guide application may communicate with a particular website (e.g., a website associated with Nielsen Online, Sysomos Solutions, Umbria, etc.), sometimes for a fee in exchange for services and/or licensed software, to determine the quantity of chatter, associated with the particular television content, present within Internet-based chat rooms, discussion groups, blogs, etc. More particularly, the guide application may generate a search query, in a manner similar to that described above, and may obtain information, from web server 280, regarding the quantity of user-generate media (e.g., text, video, audio, etc.) associated with the particular television content, that exists in open-text forums at a particular point in time and/or over a particular period of time (e.g., specified from a particular start date to a particular end date).

The guide application may use the Internet activity information, received from web server 280, to determine the relative popularity of television content, such as by ranking the selected television content against other television content based on the amount of Internet activity.

A program popularity operation to determine the aggregate popularity of television content may be performed. For example, the guide application may determine the aggregate popularity of television content when the guide application determines that the user has enabled aggregate popularity data item 522 of FIG. 5. In this example, the guide application may determine the popularity of television content based on information obtained from the program popularity operations (e.g., operations to determine popularity based on demand, operations to determine popularity based on Internet activity level, etc.) that were specified by the user via television content popularity 522 of FIG. 5.

Determining aggregate popularity associated with television content may be done in a number of ways. In one example, each program popularity operation may be assigned a particular weighting factor in which the sum of all weighting factors is to be approximately 1 (or 100%). Assume, in this example, that viewership is to be weighted at 40% (e.g., $W_V$), quantity of online searches ($W_S$) is to be weighted at 15%, quantity of search results (e.g., $W_{SR}$) is to be weighted at 15%, and Internet activity level (e.g., $W_{AL}$) is to be weighted at 30%. Assume further that particular television content ranked eighth in viewership (e.g., $R_V$), ranked tenth in quantity of online searches (e.g., $R_S$), ranked tenth in quantity of search results (e.g., $R_{SR}$), and ranked ninth in Internet activity level (e.g., $R_{AL}$). The aggregate popularity for the particular television content would be approximately equal to 8.9 based on the following: aggregate television content popularity $(TCP_A)=W_V(R_V)+W_S(R_S)+W_{SR}(R_{SR})+W_{AL}(R_{AL})$, where $W_V+W_S+W_{SR}+W_{AL}=100\%$. Therefore, other television content with $TCP_A>8.9$ would be less popular than the particular television content and other television content with $TCP_A<8.9$ would be more popular than the particular television content. Additionally, or alternatively, the guide application may determine the popularity trend associated with the particular television content by comparing the computed $TCP_A$ with $TCP_A$ information from a previous point in time. The guide application may maintain and store (e.g., in database 275) information obtained from program popularity operations performed over a particular period of time.

While aggregate popularity algorithms associated with television content are described above using particular weighting factors, other weighting factors could be used to compute aggregate popularity. Additionally, or alternatively, while a particular aggregate popularity algorithm, associated with television content, is described above to compute aggregate popularity, there are other algorithms that may be used to compute aggregate popularity than are described above.

If no television content popularity features are enabled (block 610—NO) and if any performer popularity features are enabled (block 614—YES), then a performer popularity operation may be performed (block 616). For example, the guide application may determine whether any performer popularity features 520 of FIG. 5 have been enabled. The guide application may, in a manner similar to that described above (with respect to block 606), retrieve cloud feed information, associated with a particular performer identified by the user during the set up process 400 of FIG. 4, when the guide application determines that the user has enabled a particular performer data item 524 of FIG. 5 (e.g., what others are saying).

In another example, the guide application may obtain cloud feed information for performers associated with the selected television content and/or other television content corresponding to the same broadcast time as the selected television content. In this example, the guide application may determine the performers associated with the selected television content and/or the other television content by reading the performer information (e.g., names of actors, actresses, directors, producers, etc.) associated with the selected television content and/or other television content stored in memory (e.g., the memory associated with content delivery system 255).

A performer popularity operation to determine performer demand may be performed. For example, the guide application may determine the performer demand when the guide application determines that the user has enabled demand level data item 524 of FIG. 5. In this example and in a manner similar to that described above (with respect to block 612), the guide application may communicate with web servers 280, that host particular websites (e.g., IMDB, TV Guide, etc.) that contain content, such as performer popularity charts (e.g., top actors, top actresses, top directors, etc.), to obtain performer popularity information. In another example, the guide application may monitor voting associated with the particular performer, from users associated with video clients 260 with which content delivery system 255 is connected. The user may vote in favor of or not in favor of a particular performer by pressing a particular button on remote control 270 and/or by selecting a particular button on a cloud activity guide user interface to be described in detail below. The guide application may use the information, received from web server 280, to determine the demand associated with a particular performer, such as by ranking the particular performer against other performers based on the quantity of favorable votes received and/or based on the ranking of the particular performer on top performer charts.

In another example, the guide application may obtain other performer information from web servers 280. For example, the guide application may obtain biographical information, images, filmography information, awards received and/or other information associated with a particular performer.

A performer popularity operation, to determine the Internet activity level associated with the particular performer, may be performed. For example, the guide application may determine the amount of chatter, associated with the particular performer and in a manner similar to that described above (with respect to block 612), when the guide application determines that the user has enabled Internet activity level 524 of FIG. 5. In this example, the guide application may communicate with web server 280 that hosts a website that permits access to a proprietary search engine (e.g., Google, Yahoo, etc.). In another example, the guide application may include a search engine and may perform a search. The guide application may generate a search query for the particular performer that may include a name associated with the performer, particular television content with which the performer is associated, a particular point in time and/or a particular period of time (e.g., specified from a particular start date to a particular end date), etc. The guide application may conduct a search, via the search engine, to determine the number of results associated with the particular performer based on the search query.

In another example, the guide application may communicate with a web server 280 that hosts a website that permits access to proprietary tools and/or methods that track the quantity of searches performed for a particular topic (e.g., Google Trends, etc.), based on a search query. The guide application may generate a search query, similar to that described above, and may receive results associated with a search volume associated with the particular performer, which may be an indicator of an Internet activity level associated with the particular performer.

In yet another example, the guide application may communicate with web server 280 that hosts a website that permits access to proprietary methods or tools that are capable of measuring Internet chatter associated with the particular performer. In a manner similar to that described above (with respective to block 612), the guide application may communicate with a particular website (e.g., a website associated with Nielsen Online, Sysomos Solutions, Umbria, etc.) to determine the quantity of chatter, associated with the particular performer, present within Internet-based chat rooms, discussion groups, blogs, etc. at a particular point in time and/or over a particular period of time. The guide application may use the chatter information, received from web server 280, to determine the relative popularity of particular performer.

In still another example, a performer popularity operation, to determine the Internet sentiment level associated with a performer, may be performed. For example, the guide application may communicate with web server 280 that hosts a website that permits access to proprietary methods or tools that are capable of measuring Internet sentiment associated with a particular performer, such as whether a participant in a discussion forum is expressing a favorable view of the particular performer or a view that is not favorable of the particular performer. The guide application may communicate with a particular website (e.g., a website associated with Nielsen Online, Sysomos Solutions, Umbria, etc.) to determine the sentiment associated with the chatter, corresponding to the particular performer, present within Internet-based chat rooms, discussion groups, blogs, etc. at a particular point in time and/or over a particular period of time. In one example, the guide application may receive Internet sentiment information, from web server 280, obtained from a group of Internet-based open-text forums (e.g., chat rooms, discussion groups, blogs, etc.), indicating that 50% of the user sentiment is determined to be favorable, 25% of user sentiment is determined to be neutral (e.g., neither favorable nor unfavorable), and 25% of user sentiment is determined to be unfavorable toward the particular performer. The guide application may use the Internet sentiment information, received from web server 280, to determine the relative favorability of the particular performer.

A performer popularity operation to determine the aggregate popularity of a performer may be performed. For example, the guide application may determine the aggregate popularity of the particular performer when the guide application determines that the user has enabled aggregate popularity data item 524 of FIG. 5. In this example, the guide application may determine the popularity of the particular performer based on information obtained from the performer popularity operations that were specified by the user via performer popularity data item 524 of FIG. 5.

In a manner similar to that described above (with respect to block 612), the aggregate popularity, associated with a particular performer, may be determined in a number of ways. In one example, each performer popularity operation may be assigned a particular weighting factor in which the sum of all weighting factors is equal to approximately 1 (or 100%). Assume, in this example, that user voting is to be weighted at 30% (e.g., $Y_V$), quantity of online searches ($Y_S$) is to be weighted at 25%, Internet sentiment level (e.g., $Y_{SL}$) is to be weighted at 15%, and the Internet activity level (e.g., $Y_{AL}$) is to be weighted at 30%. Assume further that a particular performer ranked eighth in voting (e.g., $R_V$), ranked tenth in quantity of online searches (e.g., $R_S$), ranked tenth in Internet sentiment level (e.g., $R_{SL}$), and ranked ninth in Internet activity level (e.g., $R_{AL}$). The aggregate popularity for the particular performer may be approximately equal to 9.1 based on the following: aggregate performer popularity $(P_A)=Y_V(R_V)+Y_S(R_S)+Y_{SL}(R_{SL})+Y_{AL}(R_{AL})$, where $Y_V+Y_S+Y_{SL}+Y_{AL}=100\%$. Therefore, another performer with $P_A>9.1$ would be less popular than the particular performer and the other performer with $P_A<9.1$ would be more popular than the particular performer. Additionally, or alternatively, the guide application may determine the popularity trend associated with the particular performer by comparing the computed $P_A$ with $P_A$ information from a previous point in time. The guide application may maintain and store (e.g., in database 275) information obtained from performer popularity operations performed over a particular period of time.

While aggregate popularity algorithms, associated with a performer, are described above using particular weighting factors, other weighting factors could be used to compute aggregate popularity. Additionally, or alternatively, while a particular aggregate popularity algorithm, associated with the performer, is described above to compute aggregate popularity, there are other algorithms that may be used to compute aggregate popularity than are described above.

If no performer popularity features are enabled (block 614—NO) and if any television content review features are enabled (block 618—YES), then a program review operation may be performed (block 620). For example, the guide application may perform a program review operation to obtain review information associated with selected television content when the guide application determines that the user has enabled a particular feature (e.g., reviews) of television content reviews data item 526 of FIG. 5. In this example, the guide application may communicate with web servers 280, that host particular websites (e.g., Metacritics, Filmcritics.com, Hollywood.com, TV Guide, etc.) that contain content, such as television content reviews (e.g., critic top 10 lists, review scores, such as two out of four stars, thumbs down, 65 out of 100, etc.), to obtain television content review information. In another example, the guide application may monitor user reviews for particular television content, received from users, associated with video clients 260 with which content delivery system 255 is connected, that submit reviews associated with the selected television content. The user may submit a review of the particular television content by pressing a particular button on remote control 270 and/or by selecting a particular button on a cloud activity guide user interface to be described in detail below. The guide application may maintain and store (e.g., in database 275) a database that contains television content review information obtained from critic reviews and/or reviews submitted by users associated with video clients 260.

A program review operation to determine the Internet sentiment level, associated with television content, may be performed. For example, the guide application may determine the Internet sentiment level, associated with the selected television content, when the guide application determines that the user has enabled Internet sentiment level 526 of FIG. 5. In this example, the guide application may communicate with web server 280 that hosts a website that permits access to proprietary methods or tools that are capable of measuring Internet sentiment associated with the particular television content, such as whether a participant in a discussion forum is expressing a favorable view of the particular television content or a view that is not favorable of the particular television content. The guide application may communicate with a particular website (e.g., a website associated with Nielsen Online, Sysomos Solutions, Umbria, etc.) to determine the sentiment associated with the chatter, corresponding to the particular television content, present within Internet-based chat rooms, discussion groups, blogs, etc. at a particular point in time and/or over a particular period of time (e.g., specified from a particular start date to a particular end date). The guide application may use the Internet sentiment information, received from web server 280, to determine the relative favorability of particular television content.

A program review operation to determine the aggregate review of television content may be performed. For example, the guide application may determine the aggregate review of the particular television content when the guide application determines that the user has enabled aggregate review data item 526 of FIG. 5. In this example, the guide application may determine the aggregate review of the particular television content based on information obtained from the program review operations that were specified by the user via television content reviews data item 526 of FIG. 5. Aggregate reviews, associated with television content, may be determined in a number of ways. In one example, each program review operation may be assigned a particular weighting factor in which the sum of all weighting factors is equal to approximately 1 (or 100%). Assume, in this example, that critic reviews are to be weighted at 35% (e.g., $Z_{CR}$), user reviews ($Z_U$) is to be weighted at 25% and Internet sentiment level (e.g., $Z_{SL}$) is to be weighted at 40%. Assume further that particular television content is ranked eighth based on critic reviews (e.g., $R_{CR}$), is ranked tenth based on user reviews (e.g., $R_U$), and is ranked tenth based on the Internet sentiment level (e.g., $R_{SL}$). The aggregate review for the particular television content would be approximately equal to 9.3 based on the following: aggregate reviews $(R_A)=Z_{CR}(R_{CR})+Z_U(R_U)+Z_{SL}(R_{SL})$, where $Z_{CR}+Z_U+Z_{SL}=100\%$. Therefore, other television content with $R_A>9.3$ would be ranked less favorably, based on the aggregate review, than the particular television content and the other television content with $R_A<9.3$ would be ranked more favorably than the particular television content based on the aggregate review.

Additionally, or alternatively, the guide application may determine the review trend, associated with the particular performer, by comparing the computed $R_A$ with $R_A$ information from a previous point in time. The guide application may maintain and store (e.g., in database 275) information obtained from program review operations performed over a particular period of time.

While aggregate review algorithms, associated with television content, are described above using particular weighting factors, other weighting factors could be used to compute an aggregate review. Additionally, or alternatively, while a particular aggregate review algorithm, associated with television content, is described above to compute an aggregate review, there are other algorithms that may be used to compute an aggregate review than are described above.

Information obtained from cloud activity guide operations may be presented for display (block 622). For example, information obtained from cloud activity guide operations (e.g., from the program popularity operations, from performer popularity operations, program review operations and/or other operations) may be sent to video client 260.

Video client 260 may present a cloud activity guide for display. For example, video client 260 may receive the information associated with the cloud activity guide operations and may retrieve, from memory (e.g., a memory associated with video client 260) information associated with a cloud activity guide user interface. Video client 260 may present the information associated with the cloud activity guide operations and information associated with the cloud activity guide user interface (e.g., cloud activity guide user interface 730 of FIG. 7B) to video client 260 for display.

For example, as illustrated in FIG. 7B, cloud activity guide user interface 730 may include cloudlets 110 through 170 as described in FIG. 1. Additionally, or alternatively, cloud activity guide 730 may include rising program popularity data item 732, falling program popularity data item 734, neutral program popularity data item 736, rate this data item 738 (e.g., shown as a thumbs up icon and a thumbs down icon), program review data item 740 (e.g., shown as three and a half stars), television content scroll arrow 742, cloud feed scroll bar 744, performer scroll bar 746, rising performer popularity data item 748, falling performer popularity data item 750, neutral performer popularity data item 752; consensus data item 754, return to program guide button 756, exit button 758, more performer information data item 760 (e.g., "More>>"), and/or more television content data item 762 (e.g., "More>>").

While FIG. 7B illustrates cloud activity guide user interface information that includes cloudlets 110 through 170 and data items 732 through 762, in another implementation, cloud activity guide user interface information may include fewer cloudlets and/or data items, additional cloudlets and/or data items, different cloudlets and/or data items, or differently arranged cloudlets and/or data items than are described with respect to FIG. 7B.

Rising program popularity data item 732 may include information obtained from program popularity operations as described above with respect to block 612. For example, rising program popularity data item 732 could include rankings and/or information based on television content viewership, popularity charts, Internet activity, aggregate popularity, etc. As shown in FIG. 7B, rising program popularity data item 732 illustrates increasing television content popularity based on current program popularity information, associated with particular television content (e.g., TrueBlood), as compared with program popularity information from a previous point in time. Falling program popularity data 734 includes program popularity trend information that indicates decreasing popularity associated with particular television content (e.g., Two and a Half Men). Neutral program popularity data 736 includes program popularity trend information that indicates no change in popularity or a change in popularity that is less than a particular threshold associated with particular television content (e.g., Trauma).

Rate this data item 738 permits the user to select a particular thumbs up icon to indicate a favorable rating or thumbs down icon that indicates a non-favorable rating. In another implementation, the user may select an icon, data item or button that may permit the user to provide a more precise rating, such as a number on a particular scale (e.g., three out of five, six out of ten, 65 out of 100, etc.), a text narrative expressing user sentiment, etc. Video client 260 may receive the voting information and may send the voting information to content delivery system 255 for storage in database 275. The voting information, may include information associated with the vote, information associated with video client 260 (e.g., a device ID) and/or information associated with the user (e.g., username, password, PIN, etc.). Program review data item 740 may include information obtained from a program review operation, such as critical review information (e.g., three out of five stars), user review information, Internet sentiment, aggregate review information and/or narrative reviews of particular television content.

Television content scroll arrow 742 may permit the user to scroll through television content (e.g., cloudlets 120 and 130) associated with a particular broadcast time (e.g., 8:00 pm), associated with a particular genre (e.g., comedy, horror, reality, family, etc.), associated with a particular television and/or motion picture rating as specified by ratings preferences 534 of FIG. 5 (e.g., PG, R, TV-14, MA, etc.), and/or as selected by the user (e.g., by a search performed by the user via search data item 150). Cloud feed scroll bar 744 may permit the user to scroll through cloud feed information received via cloud activity guide operations. Performer scroll bar 746 may permit the user to scroll through performer popularity information obtained from performer popularity operations.

Rising performer popularity data item 748 may include information obtained from performer popularity operations as described above with respect to block 616. For example, rising program popularity data item 748 could include rankings and/or information based on user voting, performer popularity charts, Internet activity, aggregate popularity, etc. As shown in FIG. 7B, rising performer popularity data item 748 illustrates increasing performer popularity based on current performer popularity information, associated with a particular performer (e.g., Kiefer Sutherland), as compared with performer popularity information from a previous point in time. Falling performer popularity data 750 includes performer popularity trend information that indicates decreasing popularity associated with a particular performer (e.g., Charlie Sheen). Neutral performer popularity data 752 includes performer popularity trend information that indicates no change in popularity or a change in popularity that is less than a particular threshold associated with a particular performer (e.g., Aimee Garcia).

Consensus data item 754 may indicate voting information received from users (e.g., users of other video clients 260) associated with the user of video client 260 and/or other users associated with the user of video client 260 via social networking websites.

If a request to exit or to return to the program guide is received (block 624—YES—EXIT) (FIG. 6B), then process 600 may end. For example, if the user presses a particular button on remote control 270 and/or selects a particular button on the cloud activity guide (e.g., exit button 756 associated with cloud activity guide 730 of FIG. 7B), then the cloud activity guide may be exited and process 600 may end. Video client 260 may present television content, associated with a particular channel to which video client 260 was previously tuned (e.g., before the request to view interactive content was received by video client 260.

If a request to exit or to return to the program guide is received (block 624—YES—RETURN TO PROGRAM GUIDE), then a request for cloud feed information associated with selected television content may be received (block 602). For example, if the user presses a particular button on remote control 270 and/or selects a particular button on the cloud activity guide (e.g., return to program guide button 758 associated with cloud activity guide 730 of FIG. 7B), then video client 260 may retrieve, from a memory associated with video client 260, information associated with a program guide (e.g., program guide user interface 700 of FIG. 7A) and/or may send the request to content delivery system 255. Content delivery system 255 may receive the request and, in a manner similar to that described above at block 606, the guide application may communicate with web servers 280, that may host websites corresponding to cloud feeds specified by the user, to receive cloud feed information.

If a request to exit or to return to the program guide is not received (block 624—NO) and if a request for a performer cloud activity guide is received (block 626—YES), then information associated with the performer cloud activity guide may be retrieved and the information associated with the performer cloud activity guide may be presented for display (block 628). For example, the user may request to view a performer cloud activity guide associated with a particular performer (e.g., by pressing a particular button on remote control 270 or by selecting more performer information data item 760 on cloud activity guide user interface 730 of FIG. 7B). In another example, the user may request to view the performer cloud activity guide, associated with another performer obtained via a search using search data item 150 (FIG. 7B). Video client 260 may receive the request and may send the request to content delivery system 255. The request may include information associated with the particular performer, information associated with video client 260 (e.g., a device identifier), and/or information associated with the user (e.g., username, password, PIN, etc.).

Content delivery system 255 may receive the request and the guide application may retrieve information associated with the performer from database 275 that may include biographical information associated with the particular performer; filmography information associated with the particular performer; and/or historical information associated with performer popularity, obtained from performer popularity operations from a prior point in time and/or from websites, hosted by web server 280, that contain the historical information. Additionally, or alternatively, the guide application may identify other users, associated with the user of video client 260 (e.g., via the guide application and/or via social networking websites), that have specified the particular performer as a favorite performer in the settings information and/or have requested a performer cloud activity guide associated with the particular performer at a prior point in time. Content delivery system 255 may send the information associated with the performer to video client 260.

In another implementation, the guide application may retrieve information associated with another performer based on a search performed by the user for a particular performer and/or a communication with a social networking website regarding a particular performer. For example, the user may perform a search for a particular performer and/or communicate with a social networking website regarding a particular performer. The guide application may, in response to the search and/or the communication, identify another particular performer based on previous searches and/or communications performed by other users in which the other users also performed searches for the other performer and/or communicated with social networking websites regarding the other performer. The guide application may send the information associated with the other performer to video client 260 and/or may update performer popularity features (e.g., favorite performers 549 of FIG. 5) to include the other performer.

A performer cloud activity guide may be displayed. For example, video client 260 may receive the information associated with the particular performer and may retrieve information associated with the performer cloud activity guide (e.g., performer cloud activity guide user interface 770 of FIG. 7C) from a memory associated with video client 260. Video client 260 may send the information associated with the particular performer, information associated with the other performer, and/or the information associated with cloud activity guide user interface 770 to video display device 265 for display.

As illustrated in FIG. 7C, performer cloud activity guide 770 may include biography data item 772, performer gallery data item 774, friends who are fans data item 776, performer popularity history data item 778, performer popularity highs and lows data item 780, cloud feed data item 782, filmography data item 784, filmography scroll bar 786, rate this performer data item 788 and/or return to cloud activity guide button 790.

While FIG. 7C illustrates performer cloud activity guide user interface information that includes data items 772 through 790, in another implementation, performer cloud activity guide user interface information may include fewer data items, additional data items, different data items, or differently arranged data items than are described with respect to FIG. 7C.

For example, biography data item 772 may include biographical information associated with the particular performer. Performer gallery data item 774 may include images associated with the particular performer. Friends who are fans data item 776 may include information regarding other users, associated with the user of video client 260 (e.g., via the guide application and/or via social networking websites), that have specified the particular performer as a favorite performer in the settings information and/or have requested a performer cloud activity guide associated with the particular performer at a prior point in time. Performer popularity data item 778 may include historical performer popularity information over a particular period of time (e.g., 30 days, 60 days, 26 weeks, 52 weeks (as shown in FIG. 7C), etc.). The historical performer popularity information may include information (e.g., aggregate popularity rankings, Internet activity level, Internet sentiment levels, user voting, etc.) obtained from performer popularity operations discussed above (with respect to block 616). Performer popularity highs and lows data item 780 may include indications of the highest popularity level (e.g., above a first threshold) and/or the lowest popularity level (e.g., below a second threshold during a particular period of time (e.g., specified from a particular start date to a particular end date).

Cloud feed data item 782 may include cloud feed information associated with the particular performer as specified by the user in the settings information. Filmography data item 784 may include filmography information, such as a list of television content, movies, plays, commercials, etc., with which the particular performer was associated during the course of the career of the particular performer. The user may scroll through the filmography information using filmography scroll bar 786. Rate this performer data item 788 (e.g., shown as "rate this performer," a thumbs up icon, a thumbs down icon, and/or some other icon) may permit the user to vote for and/or express sentiment regarding a particular performer in a manner similar to that described above (with respect to block 616).

Settings information may be updated and updated settings information may be stored (block 630). For example, video client 260 may send an instruction to video display device 265 requesting that the user indicate (by pressing a particular button on remote control 270) whether the particular performer, associated with the performer cloud activity guide, should be added to the favorite performer information in the settings information. Video client 260 may send an update notification to content delivery system 255 when the user desires that the settings information be updated. Content delivery system 255 may receive the update notification, may add the particular performer to the favorite performer information associated with the settings information corresponding to the user and may save the updated settings information in database 275.

When the user has finished viewing the performer cloud activity guide, the user may return to the cloud activity guide by selecting a particular button on performer cloud activity guide user interface 770 of FIG. 7C (e.g., return to cloud activity guide button 790) to return to the cloud activity guide (e.g., cloud activity guide 730 of FIG. 7B). Video client 260 may receive the request and may send the request to content delivery system 255 and the guide application may perform another cloud activity guide operation in a manner similar to that described above (with respect to block 608). In another implementation, video client 260 may retrieve information associated with the cloud activity guide (e.g., cloud activity guide user interface 730 of FIG. 7B) and/or information associated with the cloud activity guide operations and may present the information associated with the cloud activity guide and/or information obtained from the cloud activity guide operations for display on video display device 265.

If a request to exit or to return to the program guide is not received (block 624—NO) and if a request for a performer cloud activity guide is not received (block 626—NO), then information associated with a program cloud activity guide may be retrieved and the information associated with the program cloud activity guide may be presented for display (block 632). For example, the user may request to view a program cloud activity guide, associated with particular television content, such as television content associated with highlighted data item 130 (e.g. "24") by selecting more television content data item 762 on cloud activity guide user interface 730 of FIG. 7B. In another example, the user may request to view the program cloud activity guide, associated with other television content, such as television content obtained via a search using search data item 150 (FIG. 7B). Video client 260 may receive the request and may send the request to content delivery system 255. The request may include information associated with the particular television content (e.g., the title "24", the broadcast time, a television channel), information associated with video client 260 (e.g., a device identifier), and/or information associated with the user (e.g., username, password, PIN, etc.).

Content delivery system 255 may receive the request and the guide application may retrieve information associated with the particular television content from database 275 that may include a list of performers associated with the particular television content; filmography information associated with a director and/or producer associated with the particular television content and/or a description of the particular television content. Additionally, or alternatively, content delivery system 255 may, in a manner similar to that described above (with respect to block 628), retrieve historical information associated with the particular television content popularity, obtained from program popularity operations from a prior point in time and/or from websites, hosted by web server 280, that contain the historical information. Additionally, or alternatively, the guide application may, in a manner similar to that described above (with respect to block 628), identify other users, associated with the user of video client 260 (e.g., via the guide application and/or via social networking websites) that have requested a program cloud activity guide associated with the particular television content at a prior point in time. Content delivery system 255 may send the information associated with the particular television content to video client 260 for display on video client 260.

In another implementation, the guide application may retrieve information associated with other television content based on a search performed by the user for the particular television content and/or a communication with a social networking website regarding the particular television content. For example, the user may perform a search for the particular television content and/or may communicate with a social networking website regarding the particular television content. The guide application may, in response to the search and/or the communication, identify other television content based on previous searches and/or communications performed by other users in which the other users also performed searches for the other television content and/or communicated with social networking websites regarding the other television content. The guide application may send the information associated with the other television content to video client 260 and/or may update preferences (e.g., genre 532 and/or ratings 534 of FIG. 5) to include genre's, ratings and/or other preferences associated with the other television content.

A program cloud activity guide may be displayed. For example, video client 260 may receive the information associated with the particular television content and may retrieve information associated with the program cloud activity guide user interface from a memory associated with video client 260. Video client 260 may send the information associated with the particular television content, information associated with the other television content, and/or the information associated with program cloud activity guide user interface to video display device 265 for display.

In a manner similar to that described above (with respect to performer cloud activity guide user interface 770 of FIG. 7C), the program cloud activity user interface may include information associated with friends who are fans of the particular television content; historical television popularity information over a particular period of time (e.g., 30 days, 60 days, 26 weeks, 52 weeks), such as aggregate popularity rankings, Internet activity level, Internet sentiment levels, user voting, etc., obtained from program popularity operations discussed above (with respect to block 612); particular television content popularity highs and lows during a particular period of time (e.g., specified from a particular start date to a particular end date); and/or cloud feed information associated with the particular television content as specified by the user in the settings information.

Additionally, or alternatively, the program cloud activity guide user interface may, in a manner similar to that described above (with respect to performer cloud activity user interface 770 of FIG. 7C), include filmography information for a performer (e.g., a director, a producer, etc.) associated with the particular television content, such as a list of television content, movies, plays, commercials, etc., with which the particular performer was associated through the course of the career of the particular performer; a list of performers associated with the particular television content; and/or an icon that may permit the user to vote for and/or express sentiment regarding the particular television content in a manner similar to that described above (with respect to block 616). When the user has finished viewing the program cloud activity guide, the user may return to the cloud activity guide in a manner similar to that described above (with respect to block 628).

Settings information may be updated and updated settings information may be stored (block 634). For example, video client 260 may send an instruction to video display device 265 requesting that the user indicate (by pressing a particular button on remote control 270) whether the settings information is to updated (e.g., by enabling the settings information, such as genre data item 532 and/or ratings data item 534 of FIG. 5) based on the genre information (e.g., action, horror, etc.) and/or the ratings information (e.g., TV-14) associated with the particular television content. Video client 260 may send an update notification to content delivery system 255 and content delivery system 255 may update the settings information in a manner similar to that described above (with respect to block 630). When the user has finished viewing the program cloud activity guide, the user may return to the cloud activity guide in a manner similar to that described above with respect to block 630.

Implementations described herein may provide a guide application that permits a user to receive information, associated with television content and/or associated with a performer, via a cloud activity guide, to assist the user in making a viewing decision. The guide application may be set up, by the user, to perform cloud activity guide operations that may include program popularity operations, performer popularity operations and/or program review operations. The cloud activity guide operations may generate program popularity information (e.g., from the program popularity operation), performer popularity information (e.g., from the performer popularity operation), program review information (e.g., from the program review operation), and/or other cloud activity guide information. The guide application may permit the user to dynamically receive cloud activity guide information that the user may use to determine which television content to view and/or to improve the user viewing experience.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4 and 6A-6B, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, comprising:
   storing, in a memory associated with the server device, settings information associated with a video client, the settings information including an indicator of which type of operation, of a plurality of operations, are permitted by a user of the video client, wherein the plurality of operations include a first operation, a second operation, and a third operation;
   receiving, by the server device and from the video client, a request to perform an operation, the request including information associated with television content;
   reading, from the memory and responsive to the request, the settings information associated with the video client;
   performing, by the server device based on the indicator, the first operation to obtain program popularity information including a measure of popularity associated with the television content, wherein performing the first operation includes:
      communicating with a first server device to obtain viewership information associated a particular broadcast of the television content,
      communicating with a second server device to obtain information regarding a quantity of Internet activity associated with the particular broadcast of the television content, and
      determining, based on the obtained viewership information and the obtained quantity of Internet activity, an aggregate measure of popularity associated with the television content;
   performing, by the server device based on the indicator, the second operation to obtain performer popularity information with respect to a performer, associated with the television content, including a measure of popularity associated with the performer;
   performing, by the server device based on the indicator, the third operation to obtain program review information including reviews associated with the television content; and
   presenting, by the server device and to the video client, at east one of the program popularity information, the performer popularity information, or the program review information for display.

2. The method of claim 1, wherein performing the first operation to obtain the program popularity information further includes:
   generating a search query associated with the television content, the search query including information associated with a title of the television content;
   obtaining search results based on a search performed using the search query;
   comparing a quantity of the search results to another quantity of search results obtained from a search performed, based on the search query, at a prior point in time; and
   identifying an increase in the measure of popularity associated with the television content based on the comparison of the quantity of search results and the other quantity of search results.

3. The method of claim 1, wherein performing the second operation to obtain the performer popularity information includes:
   determining a quantity of searches performed, regarding the performer, over a particular period of time;

comparing the quantity of searches performed, regarding the performer, with a quantity of searches performed, regarding another performer, over the particular period of time; and determining the measure of popularity of the performer, with respect to a measure of popularity of the other performer, based on the comparison of the quantity of searches performed, regarding the performer, and the quantity of searches performed, regarding the other performer.

4. The method of claim 1, where performing the third operation to obtain the program review information includes:
communicating with another server device, that measures user sentiment on the Internet, to obtain user sentiment information associated with the television content, the user sentiment information reflecting a rating, of the television content, among users of the Internet.

5. The method of claim 1, where the settings information includes an indication of a type of feed information desired by the user, the feed information including information regarding discussions, associated with the television content, occurring on an Internet-based forum; and
where performing the first operation to obtain the program popularity information includes:
communicating with a server device, associated with the Internet-based forum obtain the feed information; and
sending the feed information to the video client for display.

6. A server device comprising:
a memory to store settings information associated with a video client, the settings information including an indicator of which type of operation, of a plurality of operations, is permitted by a user of the video client, wherein the plurality of operations include a first operation and a second operation; and
a processor to:
receive, from the video client, a request to perform an operation, the request including information associated with television content,
retrieve, from the memory and responsive to the request, the settings information associated with the video client,
perform based on the indicator, the first operation to obtain program popularity information including a measure of popularity associated with the television content, wherein, when performing the first operation, the processor is configured to:
obtain viewership information associated with a particular broadcast of the television content,
obtain information indicative of a quantity of searches performed regarding the particular broadcast of the television content, and
determine, based on the viewership information and the quantity of searches performed, an aggregate measure of popularity, associated with the television content,
perform, based on the indicator, the second operation to obtain program review information including a measure of popularity associated with the television content, wherein, when performing the first operation, the processor is configured to:
obtain viewership information associated with a particular broadcast of the television content,
obtain information indicative of a quantity of searches performed regarding the particular broadcast of the television content, and
determine, based on the viewership information and the quantity of searches performed, an aggregate measure of popularity, associated with the television content,
perform, based on the indicator, the second operation to obtain program review information including reviews associated with the television content, and
present at least one of the program popularity information or the program review information to the video client for display.

7. The server device of claim 6, wherein, when performing the first operation the processor is further configured to:
determine a quantity of video clients tuned to receive the television content at a particular point in time,
compare the quantity of video clients tuned to receive the television content at the particular point in time, with another quantity of video clients tuned to receive other television content at the particular point in time, and
determine the measure of popularity of the television content with respect to a measure of popularity of the other television content based on the comparison of the quantity of video clients tuned to receive the television content and the other quantity of video clients tuned to receive the other television content.

8. The server device of claim 6, wherein, when performing the first operation the processor is further configured to:
generate a search query associated with the television content, the search query including information associated with a title of the television content,
obtain search results based on the search performed using the search query;
compare a quantity of the search results to another quantity of search results obtained from a search performed using another search query, the other search query including information associated with a title of other television content, and
determine the measure popularity of the television content with respect to a measure of popularity of the other television content based on the comparison of the quantity of the search results and the other quantity of search results.

9. The server device of claim 6, wherein, when performing the first operation the processor is further configured to:
assign a first weighting factor to the viewership information associated with a prior broadcast of the television content,
assign a second weighting factor to the quantity of searches associated with the prior broadcast of the television content,
compute a first measure of popularity based on the viewership information and the first weighting factor,
compute a second measure of popularity based on the quantity of searches and the second weighting factor, and
determine another aggregate measure of popularity associated with the television content based on the first measure of popularity and the second measure of popularity.

10. The server device of claim 6, where the settings information includes an indication of a type of streaming information desired by the user, the streaming information including information regarding discussions, associated with the television content, occurring on an Internet-based forum; and
where the processor is further to:
communicate with another server device, associated with the Internet-based forum, to obtain the streaming information, and send the streaming information to the video client for display.

11. The server device of claim 6, where the processor is further to:
communicate with another server device, that measures user sentiment on the Internet, to obtain user sentiment information associated with the television content, the user sentiment information reflecting a rating among users of the Internet.

12. The server device of claim 11, wherein the processor is further configured to:
receive other user sentiment information, associated with the television content from one or more video clients tuned to receive the particular broadcast of the television content, the user sentiment information reflecting a rating among users of the one or more video clients, and
determine an aggregate rating, associated with the television content, based on the user sentiment information associated with the television content and the other user sentiment information associated with the television content.

13. A system comprising:
a server device, connected to a video client, configured to:
store, in a memory, settings information, the settings information including information regarding at least one operation specified by a user of the video client, wherein the at least one operation includes one or more of a first operation, a second operation, or a third operation,
receive, from the video client, a request to perform an operation of the at least one operation, the request including information associated with television content,
wherein, when the operation corresponds to the first operation:
perform the first operation to obtain program popularity information including a measure of popularity associated with the television content, wherein, when performing the first operation the server device is configured to:
communicate with a first server device to obtain viewership information associated with a particular broadcast of the television content,
communicate with a second server device to obtain information regarding a quantity of Internet activity associated with the particular broadcast of the television content, and
determine, based on the obtained viewership information and the obtained quantity of Internet activity, an aggregate measure of popularity associated with the television content,
wherein, when the operation corresponds to the second operation:
perform the second operation to obtain program review information including reviews associated with the television content,
wherein, when the operation corresponds to the third operation:
perform the third operation to obtain performer popularity information with respect to a performer associated with the television content, including a measure of popularity associated with the performer, and
present at least one of the program popularity information, the performer popularity information, or the program review information to the video client for display.

14. The system of claim 13, where, when performing the first operation to obtain program popularity information, the server device is further configured to:
determine a quantity of searches, associated with the television content, performed over a particular period of time;
compare the quantity of searches associated with the television content with another quantity of searches, associated with other television content, performed over the particular period of time; and
determine the measure of popularity of the television content with respect to a measure of popularity of the other television content based on the comparison of the quantity of searches associated with the television content and the other quantity of searches associated with the other television content.

15. The system of claim 13, where, when performing the second operation to obtain program review information, the server device is further configured to:
communicate with another server device, that measures user sentiment on the Internet, to obtain user sentiment information associated with the television content, the user sentiment information reflecting a rating among users of the Internet.

16. The system of claim 13, where, when performing the second operation to obtain program review information, the server device is further configured to:
receive user sentiment information associated with the television content from one or more video clients tuned to receive a broadcast of the television content, the user sentiment information reflecting a rating among users of the one or more video clients.

17. The system of claim 13, where, when performing the third operation to obtain the performer popularity information, the server device is further configured to:
generate a search query associated with the performer, the search query including information associated with a name of the performer,
obtain search results based on a search performed using the search query,
compare a quantity of the search results to another quantity of search results obtained from a search performed, based on the search query, at a prior point in time, and
identify an increase or decrease in the measure of popularity associated with the performer based on the comparison of the quantity of search results and the other quantity of search results.

18. The system of claim 17, where, when performing the third operation to obtain the performer popularity information, the server device is further configured to:
communicate with another server device to obtain information regarding Internet activity associated with the performer, the information regarding the Internet activity including a quantity of chatter associated with the performer occurring in a plurality of Internet-based forums.

19. The system of claim 13, where the server device is further configured to:
receive, from the video client, a request for performer information,
communicate with another server device to obtain the performer information, the performer information including biographical information or filmography information associated with the performer, and
send the performer popularity information and the performer information to the video client for display.

20. The system of claim 13, where the settings information includes an indication of a type of feed information desired by the user, the feed information including information regarding discussions, associated with the performer, occurring on a particular Internet-based forum; and
 where, when performing the third operation to obtain the performer popularity information, the server device is further configured to:
 communicate with another server device, associated with the particular Internet-based forum, to obtain the feed information, and
 send the feed information to the video client for display.

* * * * *